United States Patent [19]
Washisu

[11] Patent Number: 5,974,268
[45] Date of Patent: *Oct. 26, 1999

[54] IMAGE BLUR PREVENTION APPARATUS

[75] Inventor: Koichi Washisu, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,625

[22] Filed: Aug. 12, 1997

Related U.S. Application Data

[63] Continuation of application No. 08/423,704, Apr. 18, 1995, abandoned.

[30] Foreign Application Priority Data

Apr. 28, 1994  [JP]  Japan .................................. 6-091817

[51] Int. Cl.[6] .................................................. G03B 7/08
[52] U.S. Cl. ............................................................ 396/55
[58] Field of Search ........................ 396/52–55; 348/208

[56] References Cited

U.S. PATENT DOCUMENTS

| | | | |
|---|---|---|---|
| 4,731,669 | 3/1988 | Hayashi et al. | 358/229 |
| 5,117,246 | 5/1992 | Takahashi et al. | 354/202 |
| 5,153,633 | 10/1992 | Otani | 354/430 |
| 5,181,056 | 1/1993 | Noguchi et al. | 396/55 |
| 5,231,445 | 7/1993 | Onuki et al. | 354/410 |
| 5,416,554 | 5/1995 | Hamada et al. | 354/400 |

*Primary Examiner*—Safet Metjahic
*Assistant Examiner*—Michael Dalakis
*Attorney, Agent, or Firm*—Fitzpatrick, Cella, Harper & Scinto

[57] ABSTRACT

The relative positional relationship between a movable member which is moved to prevent image blur and a locking device for locking the movable member is shifted by an elastic force using a spring or the like from the relative positional relationship while image blur is being prevented to the relative positional relationship in which the locking device is able to lock the movable member. As a result, since electric power is not required for the above shift, the shift is possible even if a power supply is used up in a state in which the movable member is not locked.

29 Claims, 15 Drawing Sheets

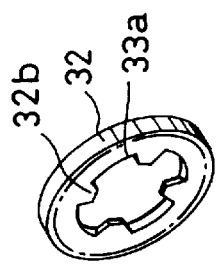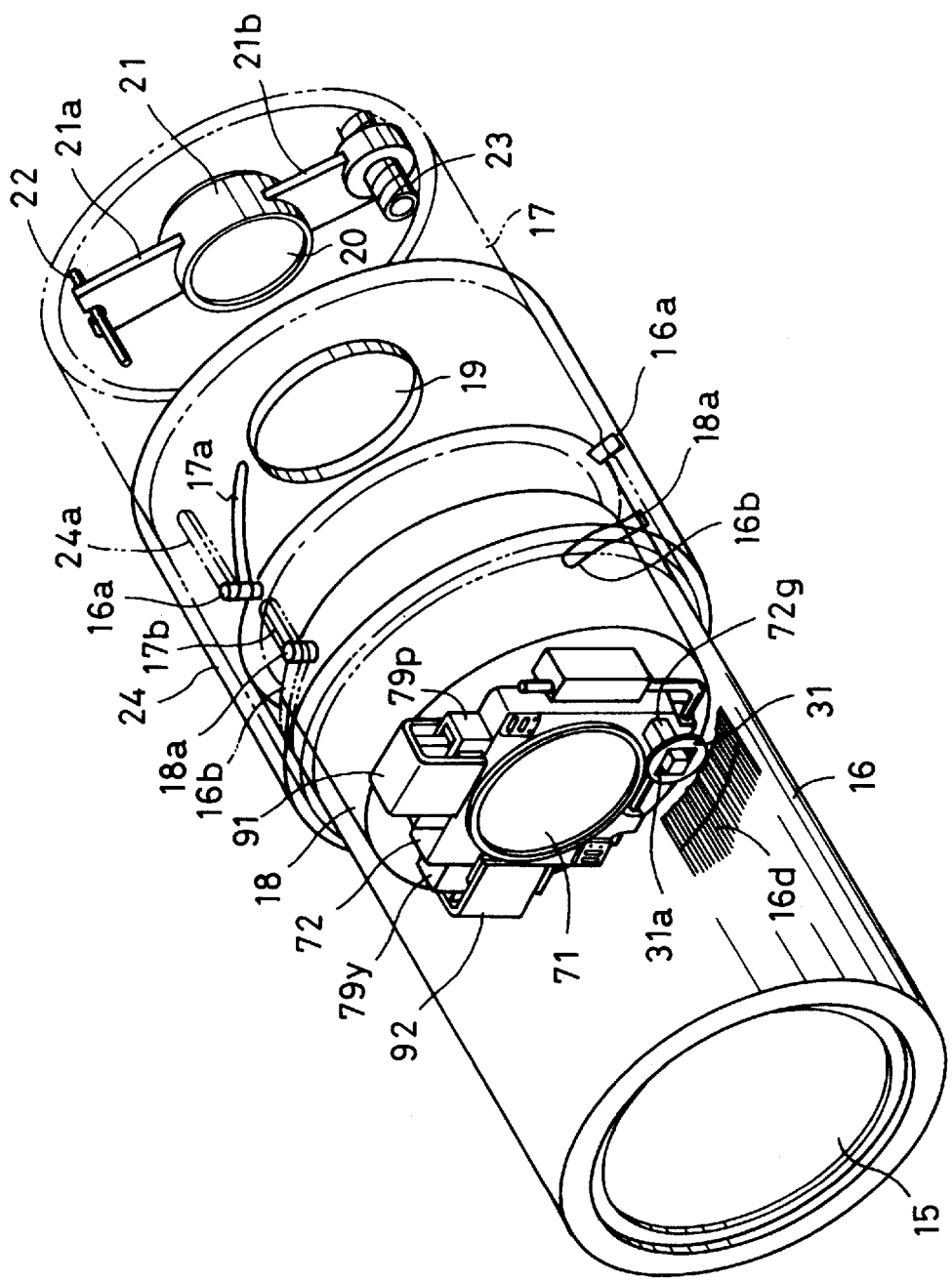

5,974,268

IMAGE BLUR PREVENTION APPARATUS

This application is a continuation of application Ser. No. 08/423,704, filed Apr. 18, 1995, now abandoned.

BACKGROUND OF THE INVENTION

1. Field of the Invention

The present invention relates to an image blur prevention apparatus for preventing an image from being blurred by moving a movable member.

2. Description of the Related Art

Camcorders having a function for preventing image blur resulting from camera shake during photographing have recently become commercialized, and also research and development for still cameras having an image blur prevention function is under way.

As an image blur prevention apparatus for preventing an image from being blurred even if the camera is shaken during photographing, apparatuses utilizing various methods have already been proposed. An example of a known optical apparatus having a shake prevention apparatus proposed by the applicant of the present invention will be explained below with reference to FIG. 14. FIG. 14 is a schematic view of a lens barrel having a shake prevention apparatus proposed by the applicant of the present invention, also schematically illustrating the shake prevention apparatus.

Referring to FIG. 14, reference numeral 82 denotes an outer barrel of the lens barrel; reference numeral 84 denotes an inner barrel which is housed in the outer barrel 82; reference numeral 83p denotes an angular displacement detecting means, mounted on the outer peripheral surface of the inner barrel 84, for detecting the angular displacement of the longitudinal shake (pitching) P of the lens barrel; reference numeral 83y denotes an angular displacement detecting means, mounted on the outer peripheral surface of the inner barrel 84, for detecting the angular displacement of the lateral shake (yawing) Y of the lens barrel; reference numeral 80 denotes a correction lens for preventing image blur on the surface of a film 88 even if the lens barrel is shaken; reference numeral 81 denotes a correction lens holding frame for holding the correction lens 80, disposed so as to face the end surface in the back portion of the inner barrel 84 in such a manner as to be movable vertically and from side to side; reference numeral 86p denotes a coil, mounted in the holding frame 81, which constitutes a part of first electromagnetic driving means for causing the holding frame 81 to move vertically; reference numeral 86y denotes a coil, mounted in the holding frame 81, which constitutes a part of second electromagnetic driving means for causing the holding frame 81 to move from side to side; reference numeral 87p denotes a longitudinal position detecting means for detecting the position when the holding frame 81 is moved vertically by the first electromagnetic driving means and the amount of the movement of the holding frame 81; reference numeral 87y denotes a lateral position detecting means for detecting the position when the holding frame 81 is moved from side to side by the second electromagnetic driving means and the amount of the movement of the holding frame 81; and reference numeral 89 denotes a cover for covering the holding frame 81 and the like.

The angular displacement detecting means 83p and 83y are formed of detecting means formed of a known vibration gyroscope or the like and an integration circuit. The longitudinal position detecting means 87p and 87y for detecting the positional change of the holding frame 81 are formed of a light projection element formed of an infrared emitting diode and a photoreceptor element formed of a known position sensing device (PSD). The output of the angular displacement detecting means 83p and 83y and the signals output from the correction lens position detecting means (PSD) are input to a control circuit (not shown) whereby predetermined processing is performed, after which two electromagnetic driving means, including the coils 86p and 86y, are driven in accordance with the signals output from the control circuit in order to control the position and driving of the correction lens 80. Hereinafter the component member formed of the correction lens 80 and the holding frame 81 will be described as correction optical means 85.

Next, specific construction examples of the lens barrel explained in FIG. 14 will be explained with reference to FIGS. 15 to 17. FIGS. 15 and 16 are exploded perspective views of another lens barrel having nearly the same construction as the lens barrel explained in FIG. 14 viewed from the film surface side, i.e., from behind in FIG. 14. In FIGS. 15 and 16, however, the outer barrel 82 and the angular displacement detecting means 83p and 83y of FIG. 14 are not shown. A specific example of the control circuit which is not depicted in FIG. 14 is shown in FIGS. 16 and 17.

Since the reference numerals used in FIG. 14 are different from those used in FIGS. 15 to 17, before an explanation of FIGS. 15 to 17 is given, the correspondence between the components designated by the reference numerals in FIG. 14 and the components designated by the reference numerals in FIGS. 15 to 17 will be explained.

In FIGS. 15 to 17, reference numeral 710 denotes a lens barrel corresponding to the inner barrel 84 shown in FIG. 14; reference numeral 71 denotes a correction lens corresponding to the correction lens 80 shown in FIG. 14; reference numeral 72 denotes a correction lens holding frame corresponding to the correction lens holding frame 81. A coil 79p mounted in the lens holding frame 72 is a coil corresponding to the coil 86p of FIG. 14; a coil 79y mounted in the lens holding frame 72 is a coil corresponding to the coil 86y of FIG. 14; the two light projecting elements 76p and 76y mounted at two places of the lens holding frame 72 are in a pair with two position detecting elements 78p and 78y, such as PSDS, mounted in the lens barrel 710, and are position detecting means corresponding to the position detecting elements 78p and 78y of FIG. 14; and reference numeral 724 denotes a cover corresponding to the cover 89.

Since, as described above, the correspondence between the construction shown in FIGS. 15 and 16 and the construction explained in FIG. 14 has become clear, a specific example of the prior art proposed by the applicant of the present invention, shown in FIGS. 15 to 17, will be explained below.

Referring to FIGS. 15 and 16, reference numeral 91 denotes a magnetic pole unit which, together with the coil 79p, constitutes electromagnetic driving means along the vertical direction, which unit is placed in a recess portion 710pb on the back end surface of the lens barrel 710, and a yoke $712p_3$ which will be described later is inserted into the coil 79p and fixed to the lens barrel 710. A magnetic pole unit 92 constitutes electromagnetic driving means along the lateral direction, which unit is placed in a recess portion 710yb on the back end surface of the lens barrel 710, and a yoke 712y3 is inserted into the coil 79y and fixed to the lens barrel 710.

The magnetic pole units 91 and 92 each are formed by making two magnets sandwiched between three yokes. In the pole unit 91, two magnets 713p are sandwiched and held between three yokes 712$p_1$ to 712$p_3$. In the pole unit 92, two magnets 713y are sandwiched and held between three yokes 712$y_1$ to 712$y_3$.

The lens holding frame 72 is supported by a support arm 75 shown in FIG. 15 so as to be able to move vertically and from side to side. The support arm 75 is mounted in a claw portion 710a on the back end surface of the lens barrel 710.

Reference numeral 93 denotes a lock/unlock apparatus (locking means) for prohibiting and releasing the movement of the lens holding frame 72, which lock/unlock apparatus has a solenoid 719 for locking and unlocking the holding frame 72 and a spring 720 for maintaining the unlocked state. The lock/unlock apparatus 93 is disposed so as to face the lower portion on the back end side of the lens holding frame 72 and is fixed to the back end surface of the lens barrel 710 by means of screws.

A correction optical means drive control circuit 94 (FIG. 16) for driving and controlling coils 79p and 79y of the electromagnetic driving means are connected to the coils 79p and 79y, and connected to the position detecting elements 78p and 78y, such as PSDs, which are position detection signal output means for the lens holding frame 72, and are also connected to a camera control circuit (not shown) and a lens barrel control circuit (not shown).

As shown in FIG. 15, a bearing 73y is press-fitted to the lens holding frame 72, and a support shaft 74y is supported so as to slide axially by the bearing 73y. A recess portion 74ya of the support shaft 74y is engaged with a claw 75a of the support arm 75 shown in FIG. 15. Also, as shown in FIG. 15, a bearing 73p is press-fitted to the support arm 75, so that a support shaft 74p is supported so as to slide axially.

Light projection elements 76p and 76y, such as IRED-LEDs, are bonded to light-projection device mounting holes 72pa and 72ya of the lens holding frame 72, respectively, and the terminals of the light projecting elements 76p and 76y are soldered to lids 77p and 77y, respectively, which serve also as connection substrates. The lids 77p and 77y are bonded to the lens holding frame 72. The slits 72pa and 72yb are disposed in the lens holding frame 72, and the light emitted from the light projection elements 76p and 76y enters the position detecting elements 78p and 78y through the slits 72pa and 72yb, respectively. The coils 79p and 79y are also connected to the lens holding frame 72, and the terminals of the coils are soldered to the lids 77p and 77y.

Three support balls 711 are inserted into the lens barrel 710, and a recess portion 74pa of the support shaft 74p is engaged with the claw portion 710a of the lens barrel 710.

The yokes 712$p_1$, 712$p_2$ and 712$p_3$, and the magnet 713p are bonded to each other and stacked on each other, and the yokes 712$y_1$, 712$y_2$ and 712$y_3$, and the magnet 713y are bonded to each other and stacked on each other as well. The poles of the magnets are as indicated by the arrows 713pa and 713ya. The yokes 712$p_2$ and 712$y_2$ are screwed to the recess portions 710pb and 710yb of the lens barrel 710, respectively.

The position detecting elements 78p and 78y, such as PSDs, are bonded to sensor seats 714p and 714y (714y is not shown), respectively, the position detecting elements 78p and 78y are covered with sensor masks 715p and 715y, and the terminals of the position detecting elements 78p and 78y are soldered to a flexible printed circuit board 716. Dowels 714pa and 714ya (714ya is not shown) of the sensor seats 714p and 714y are inserted into mounting holes 710pc and 710yc of the lens barrel 710, and the flexible printed circuit board 716 is screwed to the lens barrel 710 by a flexible printed circuit board stay 717. Ears 716pa and 716ya of the flexible printed circuit board 716 pass through holes 710pd and 710yd and are screwed to the yokes 712$p_1$ and 712$y_1$, respectively. The coil terminals and the light projection device terminals on the coil terminal lids 77p and 77y are respectively connected to the ears 716pa and 716ya of the flexible printed board 716 and the land portion 716b through polyurethane copper wires (three twisted wires).

The solenoid 719 is screwed to a chassis 718 of locking means 93. One end of the solenoid 719 is inserted into a lock arm 721 charged by a spring 720, and the lock arm 721 is rotatably screwed to the chassis 718 by means of a shaft screw 722. The chassis 718 of the locking means 93 is screwed to the lens barrel 710, and the terminal of the solenoid 719 is soldered to the land 716b of the flexible printed board 716.

Three adjustment screws 723 whose tips are formed in a spherical shape (FIG. 16) are screwed through the chassis 718 of a yoke 712p and the locking means 93, and the adjustment screws 723 and support balls 711 sandwich the sliding surface (the shaded portion 72c in FIG. 15) of the lens holding frame 72. The adjustment screws 723 are adjusted in screwing so as to face the sliding surface 72c with a slight clearance in between. The cover 724 is bonded to the lens barrel 710 and covers the above-described correction optical means.

In the correction optical means drive control circuit 94 shown in FIG. 16, when the output from the position detecting elements 78p and 78y is amplified by amplifier circuits 727p and 727y and input to the coils 79p and 79y, the lens holding frame 72 is driven vertically or from side to side, and the output of the position detecting elements 78p and 78y varies. When the driving directions (poles) of the coils 79p and 79y are set so that the outputs from the position detecting elements 78p and 78y will be decreased (negative feedback), the lens holding frame 72 stabilizes at a position at which the outputs of the position detecting elements 78p and 78y are nearly zero by the driving force of the coils 79p and 79y.

Compensation circuits 728p and 728y are circuits for stabilizing the control system further, and driving circuits 719p and 719y are circuits for compensating for the applied current to the coils 79p and 79y. When command signals 730p and 730y are given from outside to the control circuit 94 from the control circuit (not shown), the lens holding frame 72 is driven very accurately by the command signals 730p and 730y.

FIG. 17 is a detailed view of the correction optical means drive control circuit 94 for driving the correction optical means, also illustrating only the control system for the pitch direction p (FIG. 16). The construction is the same for the yaw direction y.

In FIG. 17, current-voltage conversion amplifiers 732pa and 732pb amplify photo-current 731pa and 731pb which is generated in the position detecting element 78p when light enters from the light projecting element 76p to the position detecting element 78p, and a differential amplifier 733p determines the difference between the outputs of the current-voltage conversion amplifiers 732pa and 732pb. The difference between the outputs is proportional to the position of the lens holding frame 72 along the pitch direction p. The current-voltage conversion amplifiers 732pa and 732pb and the differential amplifier 733p correspond to the amplifier circuit 727p in FIG. 16.

A command amplifier 734p adds the command signal 730p to the output of the differential amplifier 733p and inputs the signal to a driving amplifier 735p. A driving circuit 729p in FIG. 16 is formed of a driving amplifier 735p, transistors 736pa and 736pb, and a resistor 737p. Resistors 738p and 739p, and a capacitor 740p constitute a known phase lead circuit corresponding to the compensation circuit 728p of FIG. 16.

An addition amplifier 741p determines the output sum (the total sum of the light received by the position detecting element 78p) of the current-voltage conversion amplifiers 732pa and 732pb and inputs the total sum to a light projection element driving amplifier 742p.

Since the light projecting element 76p is very susceptible to temperature or the like and the amount of light projection of the light projecting element 76p varies, the position detecting sensitivity of the differential amplifier 733p varies with the change in the amount of light projection. However, by driving the light projection element in accordance with the total sum of the light received by the position detecting element 78p as described above, i.e., by effecting control for maintaining the amount of light received at a constant level such that when the total sum of the light received is decreased, the amount of light emitted from the light projecting element 76p is increased, the position detection sensitivity change will be decreased.

In the above-described construction, the lock arm 721 which constitutes one member of the locking means 93 for locking and unlocking the lens holding frame 72 is turned about the screw 722 by means of the solenoid 719, and when a dowel 721a in the tip of the lens holding frame 72 is inserted into a hole 72d of the lens holding frame 72, the lens holding frame 72 will be locked.

A permanent magnet which is contained in the solenoid 719 and a movable iron core 719a which is connected to the lock arm 721 constantly attract each other. Therefore, when the lens holding frame 72 is locked, the locked state of the lens holding frame 72 is maintained even if no electric current is supplied to a coil (not shown) of the solenoid 719. When electric current is supplied to the coil of the solenoid 719 in a desired direction, the electromagnetic force of the coil cancels the attraction force of the permanent magnet, causing the force for urging the lock arm 721 toward the lock arm 721 to be weak. Since the lock arm 721 is urged by the spring 720 so as to be away from the lens holding frame 72, when the attraction force between the solenoid 719 and the movable iron core 719a becomes weak, the dowel 721a is pulled out of the hole 72d of the lens holding frame 72 by means of the force of the spring 720, causing the lens holding frame 72 to be unlocked. Since the attraction force between the solenoid 719 and the movable iron core 719a is not present even if the supply of electric current is stopped, the unlocked state of the lens holding frame 72 will be maintained by the urging force of the spring 720.

Next, when electric current is supplied to the coil of the solenoid 719 in an opposite direction, the solenoid 719 attracts the movable iron core 719a by the total force of the electromagnetic force and the attraction force of the permanent magnet. Thus, the urging force of the spring 720 is overcome, and the dowel 721a enters the hole 72d, causing the lens holding frame 72 to be locked.

As described above, electric current may also be supplied to the solenoid 719 only during a very short time as when the lens holding frame 72 is locked and unlocked, and the supply of electric current need not be continued more than that. Thus, the locking means 93 saves power.

The above-described optical apparatus of the prior art has the problems described below.

① Maintaining the lens holding frame 72 in a locked or unlocked state is likely to be unstable.

② Space efficiency is not good because the locking means 93 protrudes greatly outside the lens barrel 710.

③ Although the locking means 93 of the lens holding frame 72 has a function for locking and unlocking the lens holding frame 72, it does not have a function for restricting the movable range of the lens holding frame 72 when the lens holding frame 72 is unlocked, i.e., becomes ready for a correction operation.

The above problems will be explained below in more detail.

① The operation for locking and unlocking the lens holding frame 72 is performed by a magnetic attraction force or a spring force. Therefore, when, for example, the lens holding frame 72 is maintained in an unlocked state, the movable iron core 719a is moved relative to the solenoid 719 by an inertial force due to disturbance vibration and the gap between the movable iron core 719a and the permanent magnet of the solenoid 719 becomes narrower, causing the magnetic attraction force to be larger than the spring force and resulting in the lens holding frame 72 being put in a locked state. If, on the contrary, disturbance vibration occurs when the lens holding frame 72 is maintained in a locked state, the lens holding frame 72 may be unlocked by the same phenomenon.

② Although the solenoid 719 is compact and does not take a large amount of space, the lock arm 721 is long in the direction at right angles to the direction the movable iron core is moved. Therefore, the provision of a space along the length of the solenoid 719 and a space along the length of the lock arm 721 at right angles to the length of the solenoid 719 is necessary, and as a result, a large amount of space is taken. Further, since the locking means 93 is disposed outside the lens barrel, the total volume of the optical apparatus is large.

③ Although the locking means 93 has a function for locking and unlocking the lens holding frame 72, it does not have a function for restricting the movable range of the lens holding frame 72 when the locked state of the lens holding frame 72 is released. Therefore, a restricting means for making the lens holding frame 72 not move more than necessary is required.

When a photograph is taken by using the above-described optical apparatus having a shake prevention apparatus, if the optical apparatus is shaken by camera shake, the operation for eliminating the image blur due to the shake is performed as a result of the lens holding frame 72 being moved in the plane which intersects the optical axis. However, since the movement of the lens holding frame 72 has not been adjusted according to other variables which influence optical apparatus and the photographic conditions, in some cases, there is the risk that on the contrary the image blur correction operation might deteriorate the image quality even more. Therefore, to realize a shake prevention apparatus suited to the primary designed purpose of the optical apparatus such that it is desired to decrease the image deterioration on the image forming plane, it is necessary to restrict the amount of the movement of the lens holding frame 72 according to the situation in which the optical apparatus is used and the photographic conditions. Also, although the image blur is corrected as a result of the lens holding frame 72 performing the image blur correction operation, optical aberration occurs due to the movement of a correction lens 71 during the image blur correction operation, and the optical aberration causes the image to be deteriorated. Therefore, the balance between the image deterioration and the image blur prevention effect must be taken into consideration. Thus, means for restricting (adjusting) the amount of movement of the lens holding frame 72 is necessary.

SUMMARY OF THE INVENTION

According to one aspect of the present invention, there is provided an image blur prevention apparatus, comprising: a movable member for preventing image blur; first means for performing an operation for making the movable member not move; and second means for varying a relative positional relationship between the movable member and the first means by means of an elastic force from a relative relationship when the movable member is displaced to prevent image blur to a relative positional relationship such that the first means is able to perform the operation.

With this construction, it is possible to form a state in which the operation is possible by the first means by means of an elastic force. If the power supply is used up, the state can be formed.

According to another aspect of the present invention, there is provided an image blur prevention apparatus comprising: a movable member for preventing image blur; first means for performing an operation for making the movable member not move; and second means for varying the relative positional relationship between the movable member and the first means by means of an urging force from a relative positional relationship when the movable member is displaced to prevent image blur to the relative positional relationship such that the first means is able to lock the movable member; and third means for changing the relative positional relationship in opposition to the urging force.

With this construction, it is possible to simplify the construction related to the arrangement for making said movable member not move.

The above and further objects, aspects and novel features of the invention will more fully appear from the following detailed description when read in connection with the accompanying drawings.

BRIEF DESCRIPTION OF THE DRAWINGS

FIG. 8 is an exploded perspective view of the essential portion of an optical apparatus in accordance with a fifth embodiment of the present invention;

FIG. 9 shows a modification of a part of the embodiment in FIG. 8;

DESCRIPTION OF THE PREFERRED EMBODIMENTS

[First Embodiment]

Figure 1:
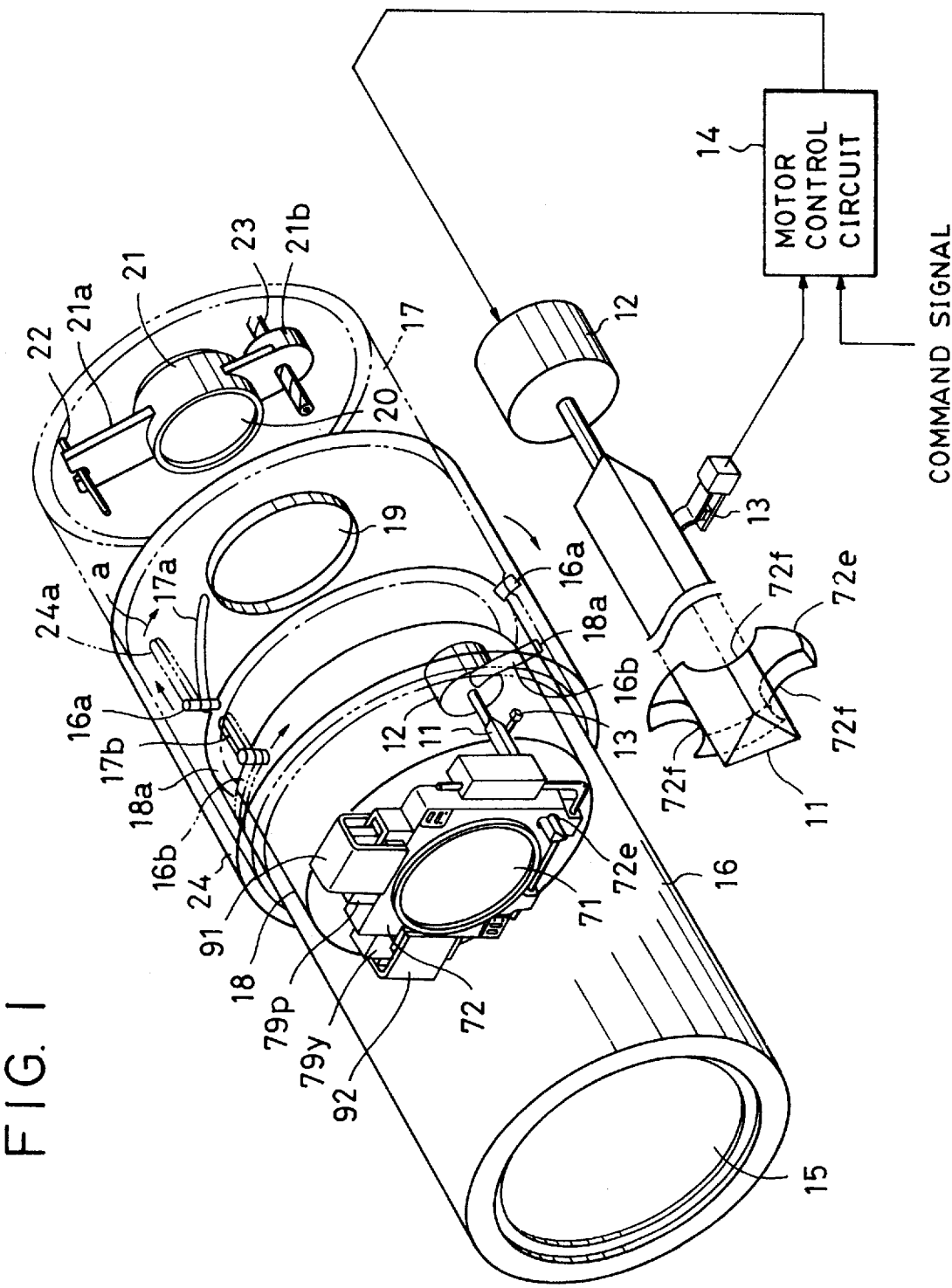
FIG. 1 is an exploded perspective view of the essential portion of an optical apparatus and a partially enlarged perspective view of the optical apparatus in accordance with a first embodiment of the present invention.

A first embodiment of the present invention will be explained below with reference to FIG. 1. FIG. 1 is an perspective view of a lens barrel for a camera as an optical apparatus having a shake prevention apparatus, to which the present invention is applied.

Figure 14:
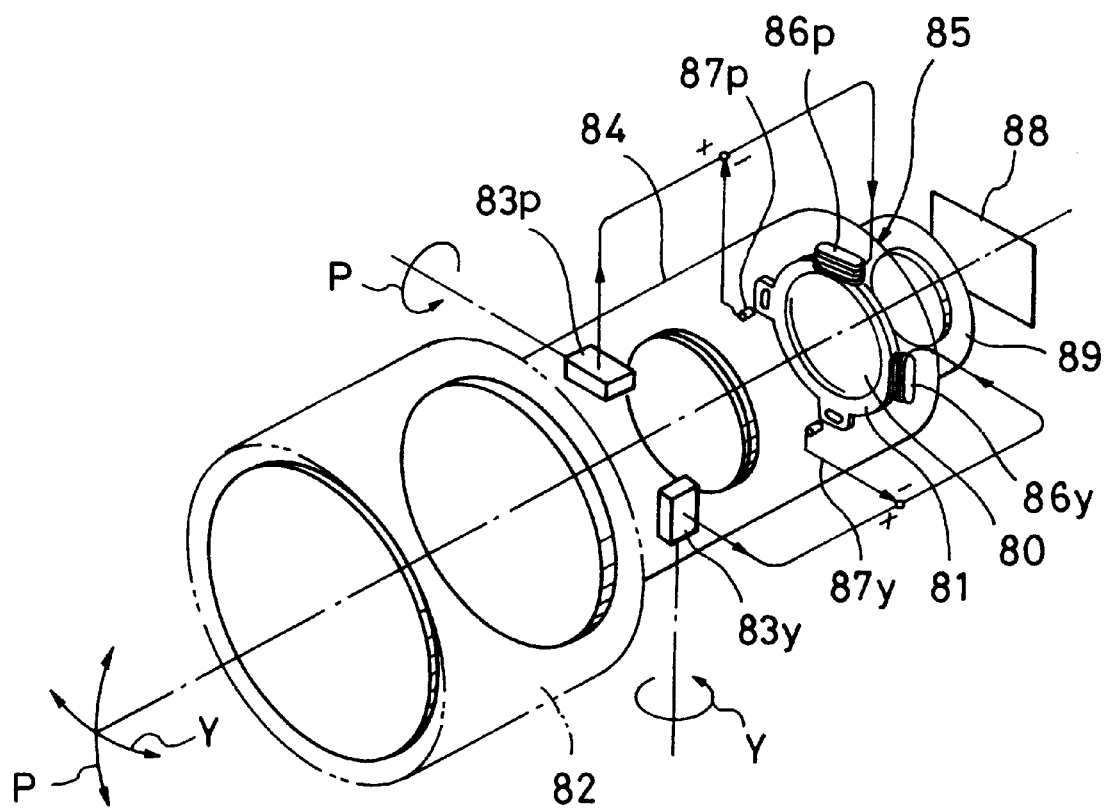
FIG. 14 is a schematic view of a shake prevention apparatus in the optical apparatus having the shake prevention apparatus of the prior art proposed by the applicant of the present invention.
Figure 15:
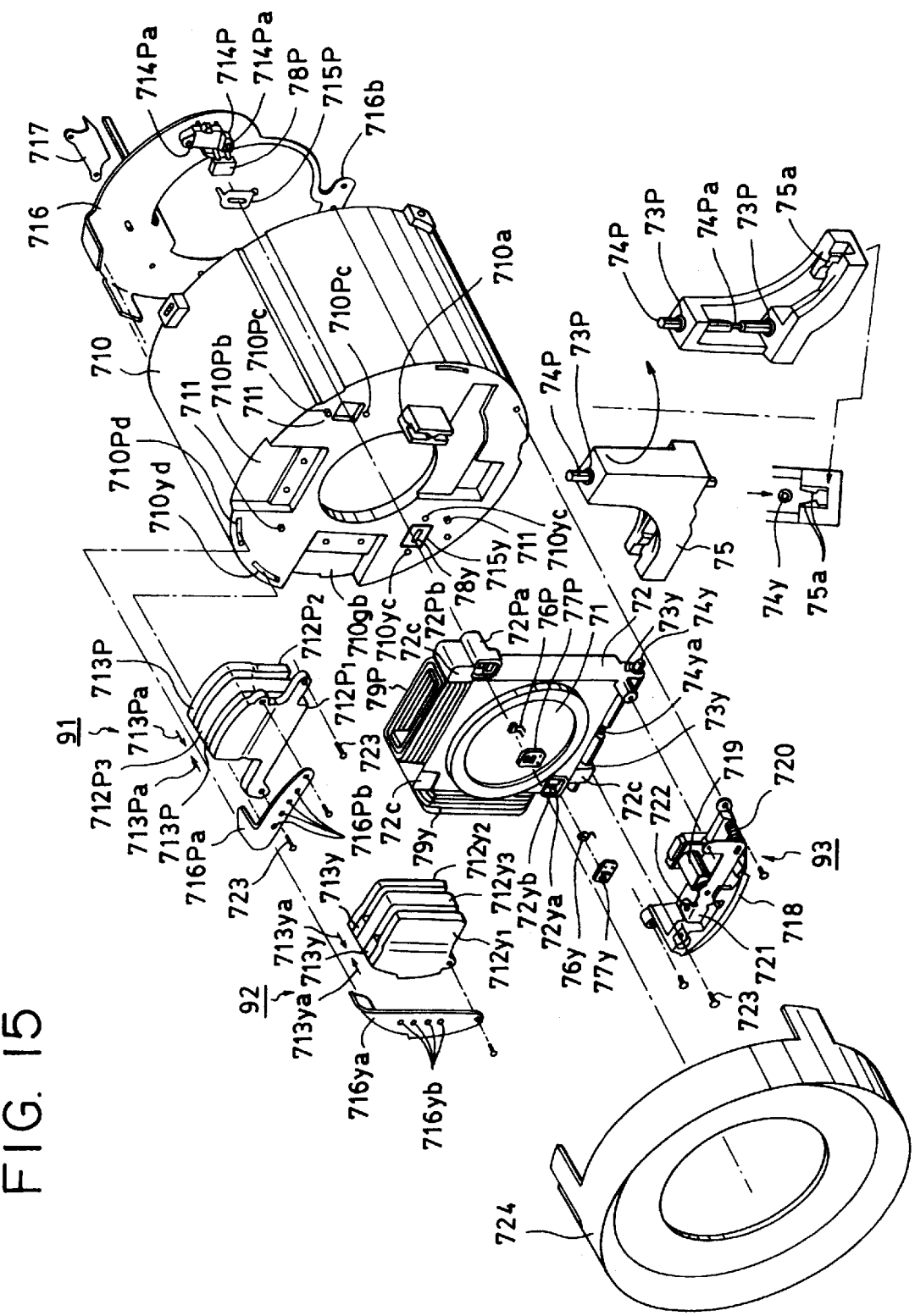
FIG. 15 is an exploded perspective view of the essential portion of an optical apparatus having the shake prevention apparatus of the prior art proposed by the applicant of the present invention.

Referring to FIG. 1, reference numeral 16 denotes a first group lens barrel having a first group lens 15 held therein; reference numeral 18 denotes a second group lens holding barrel having an image blur correction lens 71 held therein as a second group lens; reference numeral 17 denotes a fixed barrel having the first group lens barrel 16 and the second group lens barrel 18 housed so as to be able to move relatively along the optical axis; reference numeral 19 denotes a third group lens which is held by a third group lens holding frame (not shown) and which is movable in the fixed barrel 17; and reference numeral 21 denotes a fourth group lens holding frame which holds a fourth group lens 20 and which is movable along the optical axis in the fixed barrel 17. The output system of the lens barrel of this embodiment is formed of zoom lenses of four groups. As a second group lens, the image blur correction lens 71 is used which is capable of moving vertically and from side to side in the plane at right angles to the optical axis. Since driving means for driving the correction lens 71 and the lens holding frame 72 for holding the lens are components which have already been explained above, these will be described briefly with reference to FIGS. 15 and 16. The lens holding frame 72 which holds the correction lens 71, is disposed on the front end surface of the second group lens barrel 18 which corresponds to the lens barrel 710 of FIG. 15 and is supported by the second group lens holding barrel 18 so as to move vertically and from side to side in the plane at right angles to the optical axis relatively to the lens holding barrel 18. The coil 79p for vertical driving is fixed to the top surface of the lens holding frame 72, and a coil 79y for side to side driving is fixed to the right side of the lens holding frame 72. The magnetic pole unit 91 is inserted into the coil 79p in such a manner as to be movable relatively, and the magnetic pole unit 92 is inserted into the coil 79y in such a manner as to be movable relatively and both are fixed to the front side of the second group lens holding barrel 18. Since the construction of the correction optical means, including the lens holding frame 72, and the shake prevention apparatus, including the correction optical means have already been described above and since the overall construction of the shake prevention apparatus is the same as that of the optical apparatus of the present invention, no further explanation will be given. The angular displacement detecting means 83p and 83y (see FIG. 14) serving as shake detecting means are disposed in any of the outer peripheral surfaces of the flexible printed board 716, the outer peripheral surface of the second group lens holding barrel 18 or the outer peripheral surface of the fixed barrel 17; however, the illustration thereof is omitted from FIG. 1 to FIG. 13.

Arms 21a and 21b are protrusively provided along a radial direction from the outer peripheral surface of the fourth group lens holding frame 21. A U-shaped groove which is engaged with the guide cover 22 in such a manner as to be movable relatively is provided in the tip of the arm 21a, and a fixed nut portion (or a screw hole) which is screwed to a feed screw shaft 23 is provided in the arm 21b. The guide cover 22 is fixed inside the fixed barrel 17 and extends parallel to the optical axis, and the feed screw shaft 23 is supported inside the fixed barrel 17 in such a manner as to be capable of rotating only and is rotated by a motor (not shown) or the like. As a result, when the feed screw shaft 23 is rotated, the fourth group lens holding frame 21 is moved along the optical axis while the fourth group lens holding frame 21 is being guided without rotating by the guide cover 22 inside the fixed barrel 17.

Reference numeral 24 denotes a zoom operation ring which is engaged with the outer peripheral surface of the fixed barrel 17 and which is capable of being rotated only, and rotated by a user. An axial groove 24a is provided in parallel to the optical axis on the inner peripheral surface of the ring 24. A follower pin 16a (hereinafter referred to simply as pin 16a) which is protrusively provided on the outer peripheral surface of the first group lens barrel 16 is engaged with the axial groove 24a in such a manner as to slide relatively, and the pin 16a is engaged with a cam groove 17a provided on the peripheral surface of the fixed barrel 17 in such a manner as to slide relatively. A cam groove 16b is provided on the peripheral surface of the first group lens barrel 16, and a pin 18a protrusively provided on the outer peripheral surface of the second group lens holding barrel 18 is engaged with the cam groove 16b in such a manner as to slide relatively.

Therefore, when the zoom operation ring 24 is rotated in the direction of the arrow "a", the pin 16a engaged with the axial groove 24a of the ring 24 receives a force along the direction of the arrow "a" from the ring 24. However, since the pin 16a is also engaged with the cam groove 17a of the fixed barrel 17, the pin 16a is moved along the cam groove 17a, and as a result, the first group lens barrel 16 is moved toward the back along the optical axis (in the direction of the arrow "b") while the first group lens barrel 16 is rotating along the cam groove 17a. Also, since the first group lens barrel 16 is rotated, the pin 18a of the second group lens holding barrel 18, which pin 18a is engaged with the cam groove 16b of the first group lens barrel 16, receives a rotational force along the direction of the arrow "a" as well and is moved along the cam groove 16b of the first group lens barrel 16, and as a result, the pin 18a is moved toward the front along the optical axis (to the left side in FIG. 1). That is, the second group lens holding barrel 18 is designed to move along the optical axis by an amount corresponding to the difference between the angle of the cam groove 17a of the fixed barrel 17 and the angle of the cam groove 16b of the first group lens barrel 16.

The zooming of the third group lens 19 is performed by a cam mechanism which is the same as the above-described cam mechanism; however, the illustration thereof is omitted in this embodiment. Since the fourth group lens 20 is a focusing lens, the fourth group lens 20 will be moved into focus as a result of the feed screw shaft 23 being rotated by a focusing motor (not shown) after zooming is performed by the first to third lenses.

A different-shape hole 72e having a center axis parallel to the optical axis is provided in the lower corner of the lens holding frame 72, and a shaft 11 whose cross section is formed in a regular triangle is inserted into the hole 72e. The hole 72e, as shown in FIG. 2, is formed in a trifoliate like the drill tip surface, and three semicircular projection portions 72f projecting radially toward the center C at 120° intervals with respect to the center axis C are provided.

Figure 2:
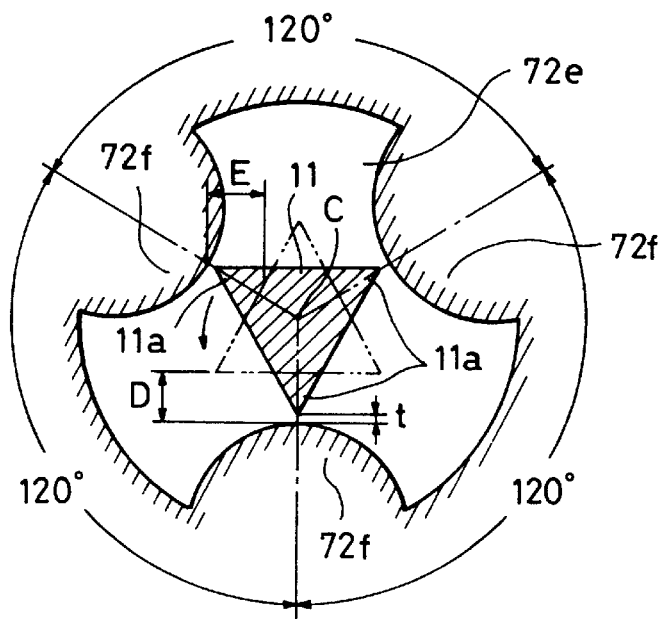
FIG. 2 is an enlarged front view illustrating the relationship between a hole 72e which constitutes restricting means of correction optical means and a shaft 11 from among the construction shown in FIG. 1.

The shaft 11 has a center axis which is the same as the center axis C of the hole 72e, as shown in FIG. 2. The shaft 11 is a shaft whose cross section is formed in a regular triangle such that each apex thereof will face the apex of each semicircular projection 72f of the hole 72e with a very small clearance t in between. The shaft 11 is supported by bearings inside the second group lens holding barrel 18 so as to be rotated about the center axis C of the hole 72e and is fixed to the shaft of a motor 12 disposed inside the fixed barrel 17.

When the relative positional relationship between the shaft 11 and the hole 72e is as indicated by the solid line in FIG. 2, only a very small clearance t is formed between each apex of the shaft 11 (i.e., each edge of the shaft 11) and the apex of each projection 72f, which clearance t is designed to prevent the shaft 11 and the hole 72e from strongly rubbing each other when the shaft 11 is rotated. Therefore, in the state shown in FIG. 2, there is no room for the relative movement of the shaft 11 and the hole 72e along the vertical direction and from side to side. Therefore, the lens holding frame 72 cannot move vertically and from side to side, and is locked. However, if the shaft 11 is rotated and reaches a state indicated, for example, by the alternately long and two short dashed lines, large clearances D and E are formed between each projection 72f of the hole 72e and the outer peripheral surface of the shaft 11. Thus, in this state, it is possible for the lens holding frame 72 to move relatively by clearance E at a maximum from side to side with respect to the shaft 11 and to move relatively by clearance D at a maximum in the vertical direction. That is, the lens holding frame 72 is unlocked, and the limits of the movement range thereof are the clearances D and E.

In other words, in the optical apparatus of the present invention, locking and unlocking means for the lens holding frame 72 have a locking and unlocking function, and a restricting means has a function for varying the movable range of the lens holding frame 72 in an unlocked state.

It is possible to vary the movable range of the lens holding frame 72 in an unlocked state by rotating at least one of the non-circular hole and the shaft as shown in FIG. 2. There are the following merits in varying the movable range by rotation.

If the locking position is set so that the optical axis of the correction lens 71 coincides with the optical axis of the other optical systems, the best optical characteristics can be obtained.

Figure 16:
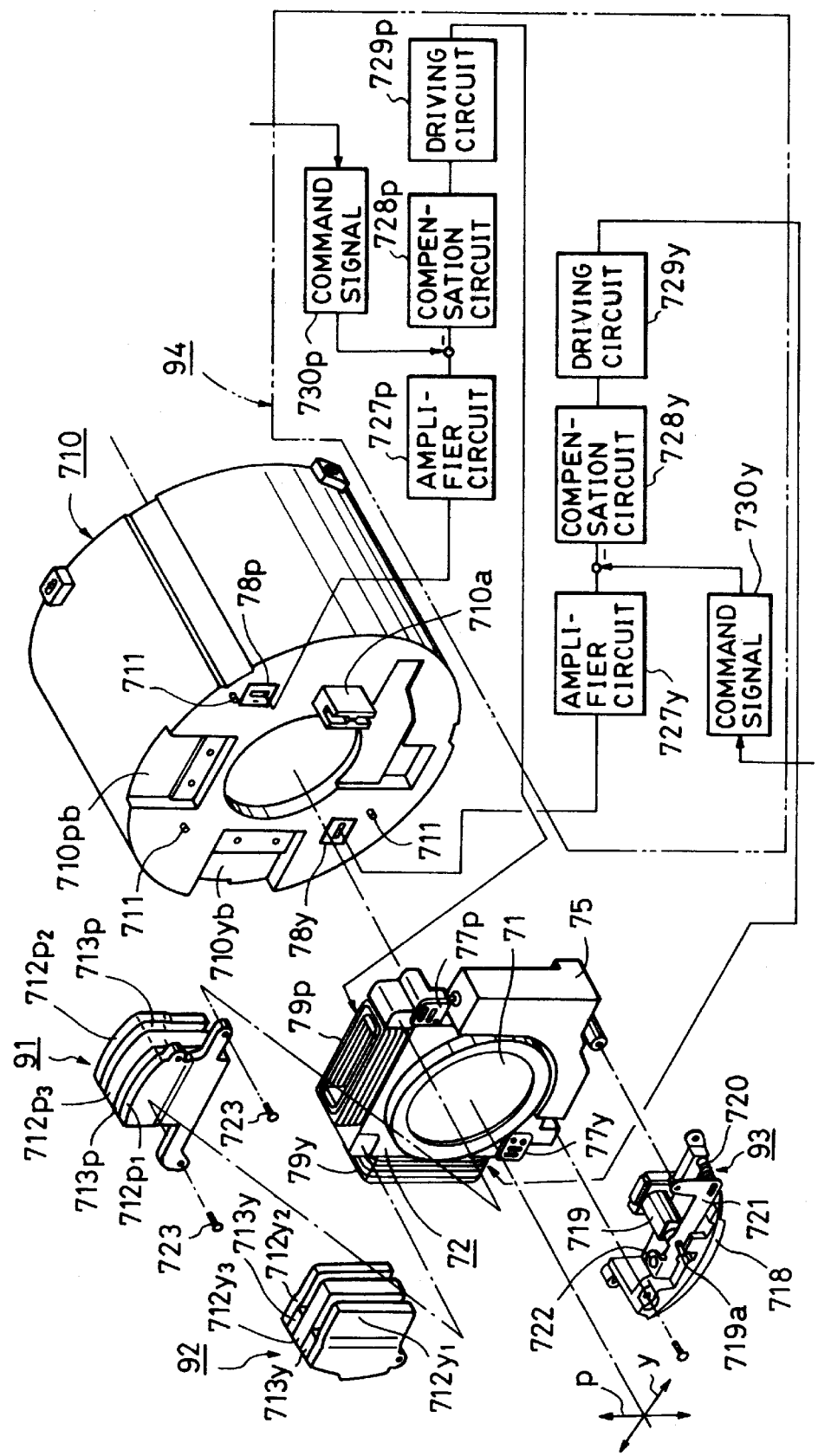
FIG. 16 is a schematic view of the mechanical and electrical arrangement of the shake prevention apparatus of the optical apparatus shown in FIG. 15.
Figure 17:
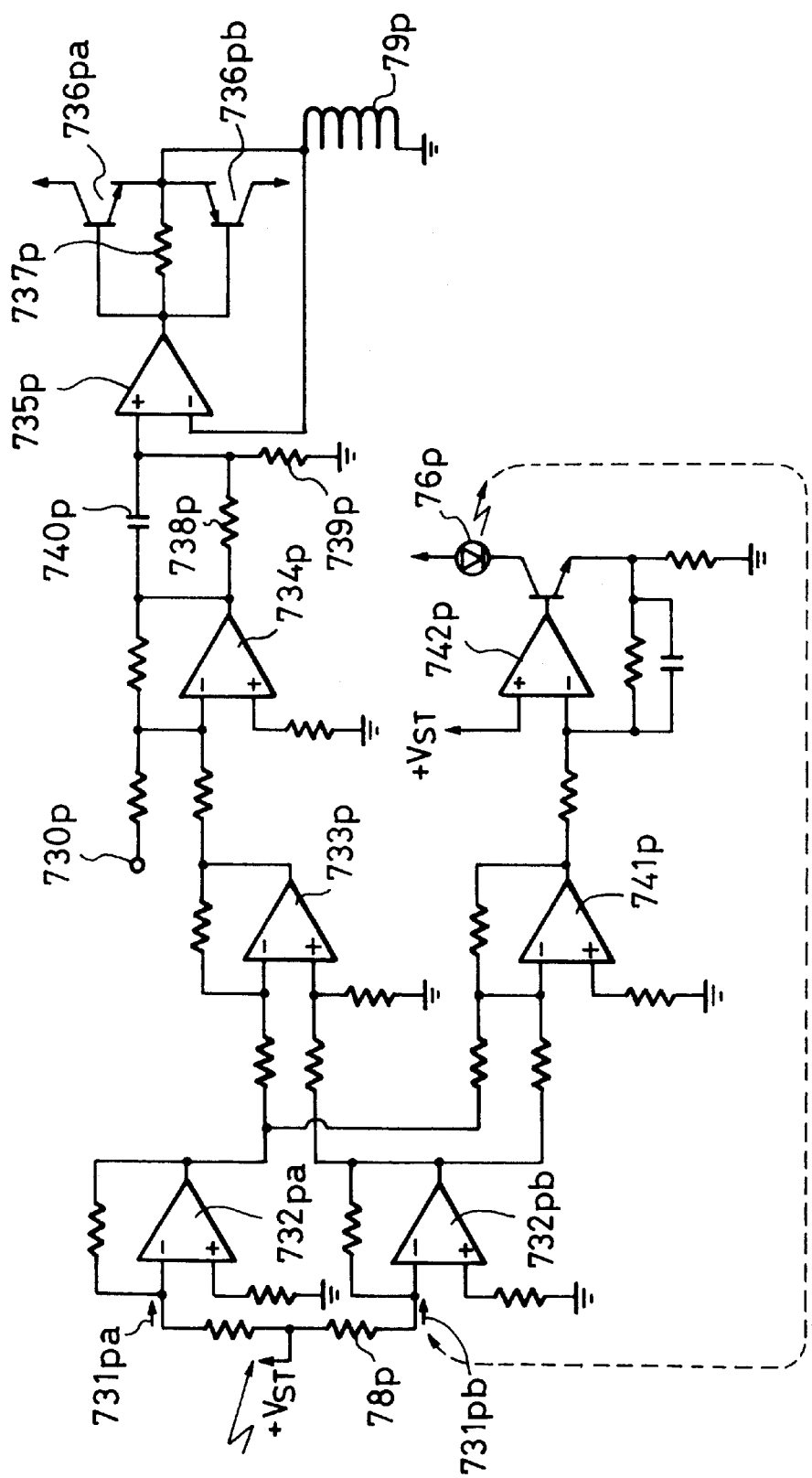
FIG. 17 shows a specific example of the circuit portion shown in FIG. 16.

Since the lens holding frame 72 is moved in the P and Y directions in FIG. 16, the hole 72e is also moved along those directions, and the movement of the hole 72e is restricted by the shaft 11. However, as is clear from FIG. 2, the shaft 11 will not be rotated by this movement. That is, even if the hole 72e is moved by an external force or impact in the locked state in FIG. 2, the shaft 11 will not be rotated and can be maintained at a locked state.

The motor 12 for rotating the shaft 11 is controlled by a control circuit 14. A command signal for switching on or off the image blur correction operation (not shown) has been input to the control circuit 14. When a command signal for activating the image blur correction is input to the control circuit 14, the motor 12 is driven to make the shaft 11 unlocked, and when a command signal for deactivating the image blur correction is input, the motor 12 is driven to lock the shaft 11.

The command signal makes it possible to make the activation and deactivation of the image blur correction accord with the operation situation of an operation member (not shown) for switching the activation and deactivation of the image blur correction, and makes it possible to make the activation and deactivation accord with the state of another action section of the camera or the like as well. For example, the image blur correction is activated only during exposure, the image blur correction is activated in response to a photographing preparation start signal, or the image blur correction is activated when the focal distance is longer than a predetermined value. Such control makes the shaft 11 stop at the position indicated by the solid line of FIG. 2 when the optical apparatus is not used or the shake prevention apparatus is not operated. Therefore, the lens holding frame 72 is maintained at a locked state.

When the lens holding frame 72 is shifted from the unlocked state to the locked state, the shaft 11 is rotated to reach the state indicated by the solid line from the state indicated by the alternately long and two short dashed lines in FIG. 2. At this time, the lens holding frame 72 is displaced from the position (the optical axis of the correction lens 71 coincides with the optical axis of the other lenses) at which the lens holding frame 72 should be when it is locked. Even if the center of the hole 72e is shifted from the center of the shaft 11, since the three apices 11a of the shaft 11 and the semicircular projections 72f are in a cam relation, the three apices 11a of the shaft 11 slide on the cam surface of the semicircular projections 72f during the course in which the shaft 11 is shifted from the state indicated by the alternately long and two short dashed lines to the state indicated by the solid line, and thus the lens holding frame 72 can be moved to the position at which the lens holding frame 72 should be when it is locked. That is, the rotational force of the shaft 11 makes it possible to act the lens holding frame 72 in a direction toward the center (the correction lens 71 is moved to the position at which the optical axis of the correction lens 71 coincides with the optical axis of the other lenses). Thus, even if the lens holding frame 72 remains dropped (displaced in the direction of the gravity) by some factors, it is possible to return the correction lens 71 to the optical axis without controlling the lens holding frame 72 again.

Although in this embodiment the cam surface (corresponding to the semicircular projections 72f) is provided on the lens holding frame 72 side and members (corresponding to the apices 11a) which are brought into abutment with the cam surface are provided on the shaft 11 which is moved for locking, these may be provided reversely, that is, the cam surface may be provided on the shaft 11 side and the members (corresponding to the apices 11a) which are brought into abutment with the cam surface are provided on the lens holding frame 72 side. The construction of the cam applies to the other embodiments which will be described later as well.

Reference numeral 13 denotes a leaf switch disposed inside the second group lens holding barrel 18. The leaf switch 13 is a switch for detecting whether one of the edges (apices) of the shaft 11 is directed directly below when the shaft 11 is at the state indicated by the solid line in FIG. 2, i.e., when the lens holding frame 72 is in a locked state. The leaf switch 13 is turned on as a result of being pressed against the edge of the shaft 11 when the shaft 11 is at the state indicated by the solid line in FIG. 2, and the signal of the switch is input to the control circuit 14 whereby it is detected that the lens holding frame 72 has been locked. Of course, any desired detecting means may be used in place of the leaf switch 13, for example, a rotary encoder, or a combination of a slit circular plate and a photo-interrupter may be used.

When a rotation position detecting means, such as a rotary encoder, a rotary multi-points switch, or a combination of a slit circular plate and a photo-interrupter, is used in place of the leaf switch 13, the detecting means may be formed into one unit with the motor 12 which is a driving source. Also, the driving source itself may generate pulses, and the pulses are input to the control circuit 14 as signals indicating the rotational angle of the shaft 11.

Figure 3:
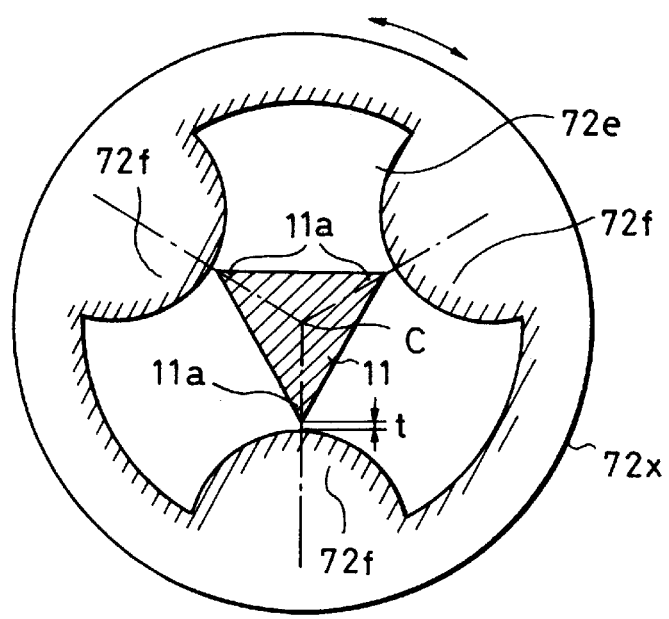
FIG. 3 shows a modification in which the relative movement relationship between the shaft and the hole is reversed in the construction of FIG. 1.

Although in the first embodiment shown in FIGS. 1 and 2 the rotatable shaft 11 is inserted into the hole 72e provided in the lens holding frame 72, conversely, as shown in FIG. 3, the shaft 11 may be fixed to the lens holding frame 72 and a rotary ring 72x having the hole 72e may be rotatably mounted in the lens holding frame 72. In that case, a disc type motor may be used as the driving source for rotating the rotary ring, and thus the apparatus can be made more compact than in the above embodiment. The shape of the hole 72e and the cross sectional shape of the shaft 11 need not be limited to the shape of the first embodiment shown in FIGS. 1 and 2.

FIG. 4 shows an example of the combinations of the shape of the hole 72e and the cross sectional shape of the shaft 11. FIG. 4(a) shows the combination of the hole 72e in a regular tetrahedron and the shaft 11 having the cross sectional shape of a regular triangle in a similar manner. In the case of this combination, when the shaft 11 is rotated 60 degrees, each edge (i.e., the apex) is brought into contact with each side of the hole 72e FIG. 4(b), causing the lens holding frame 72 to be locked.

Figure 4A:
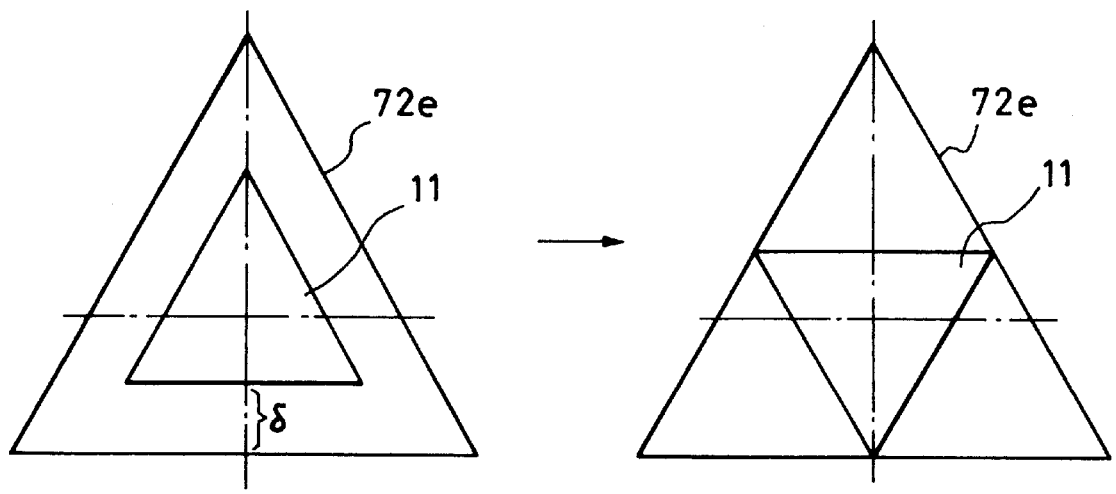
FIGS. 4(a) and 4(b) show modifications of the restricting means shown in FIGS. 1 to 3.
Figure 4B:
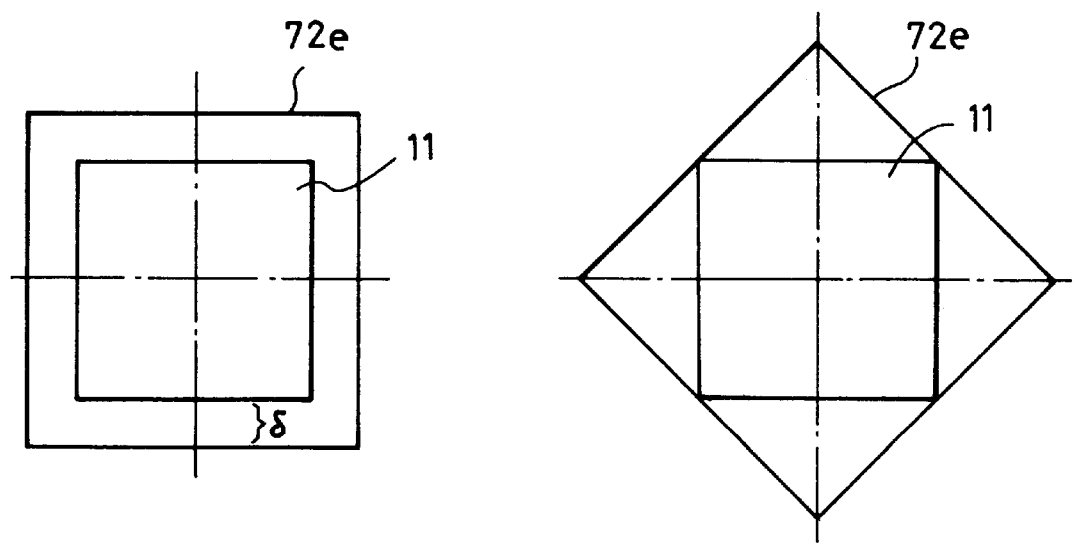
Figure 4A:
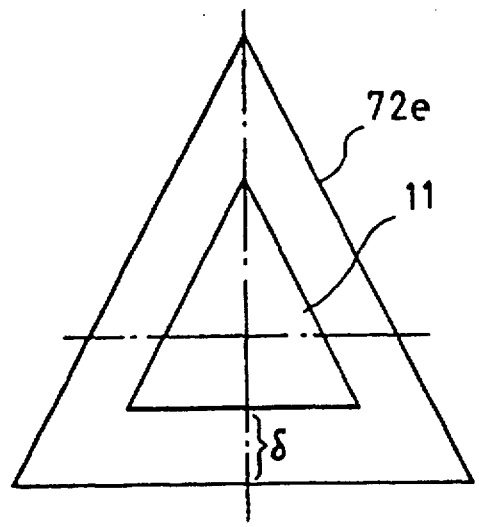
Figure 4B:
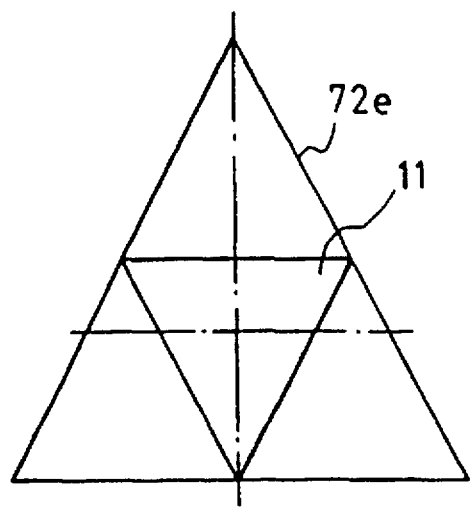
Figure 4C:
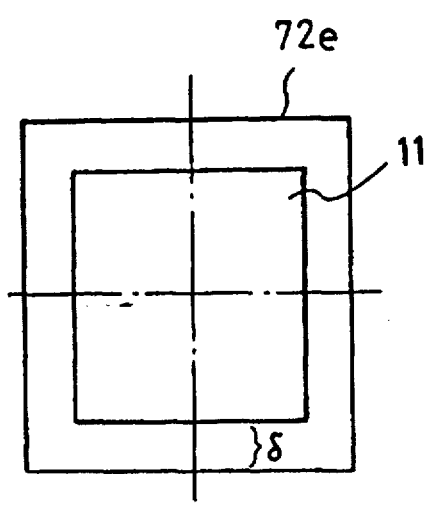
Figure 4D:
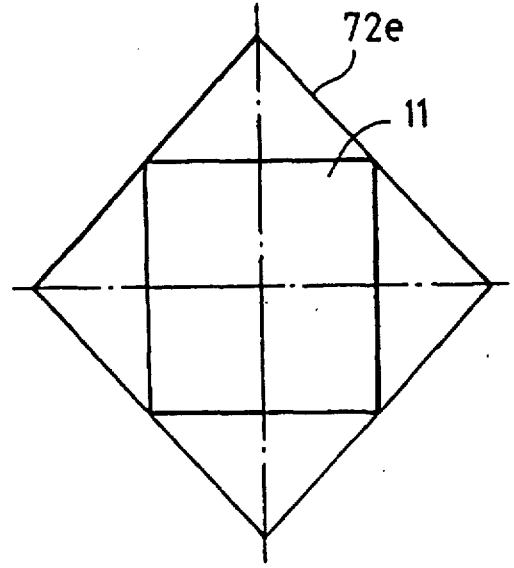

FIG. 4(c) shows the combination of the hole 72e in a square and the shaft 11 having the cross sectional shape of a square as well. In the case of this combination also, when the shaft 11 is rotated 45 degrees, each edge (i.e., the apex) is brought into near contact with each side of the hole 72e, causing the lens holding frame 72 to be prevented from being relatively moved vertically and from side to side and the lens holding frame 72 to be locked.

In the construction of FIG. 4(a), when it is designed that twice the length of one side of the triangle of the shaft 11 is nearly equal to the length of one length of the triangle of the hole 72e, the play amount δ can be decreased exceedingly. Thus, by making the length of one side of the triangle of the hole 72e slightly longer than twice the length of one side of the triangle of the shaft 11, the shaft 11 is able to rotate freely without contacting the hole 72e. That is, the motor 12 continues to rotate in one direction, and the lens holding frame 72 will be locked and unlocked repeatedly at 60 degree intervals. In such a case, the reverse rotation of the motor may be used as another power.

In the construction of FIG. 4(c), it is designed that the length of one side of the square is slightly longer than the length of the diagonal line of the square. When the shaft 11 is rotated, the play amount δ varies at 45 degree intervals (FIG. 4(d)).

In the construction of FIGS. 4(a) through 4(d), needless to say, the same advantage as that described above can be obtained by fixing the shaft 11 to the lens holding frame 72 and mounting a rotary ring having the hole 72e rotatably in the lens holding frame 72. Although the shaft 11 is rotated by using a DC motor in FIG. 1, the motor need not be limited to this example, and a rotary solenoid, a stepping motor or the like may be used.

[Second Embodiment]

Figure 5:
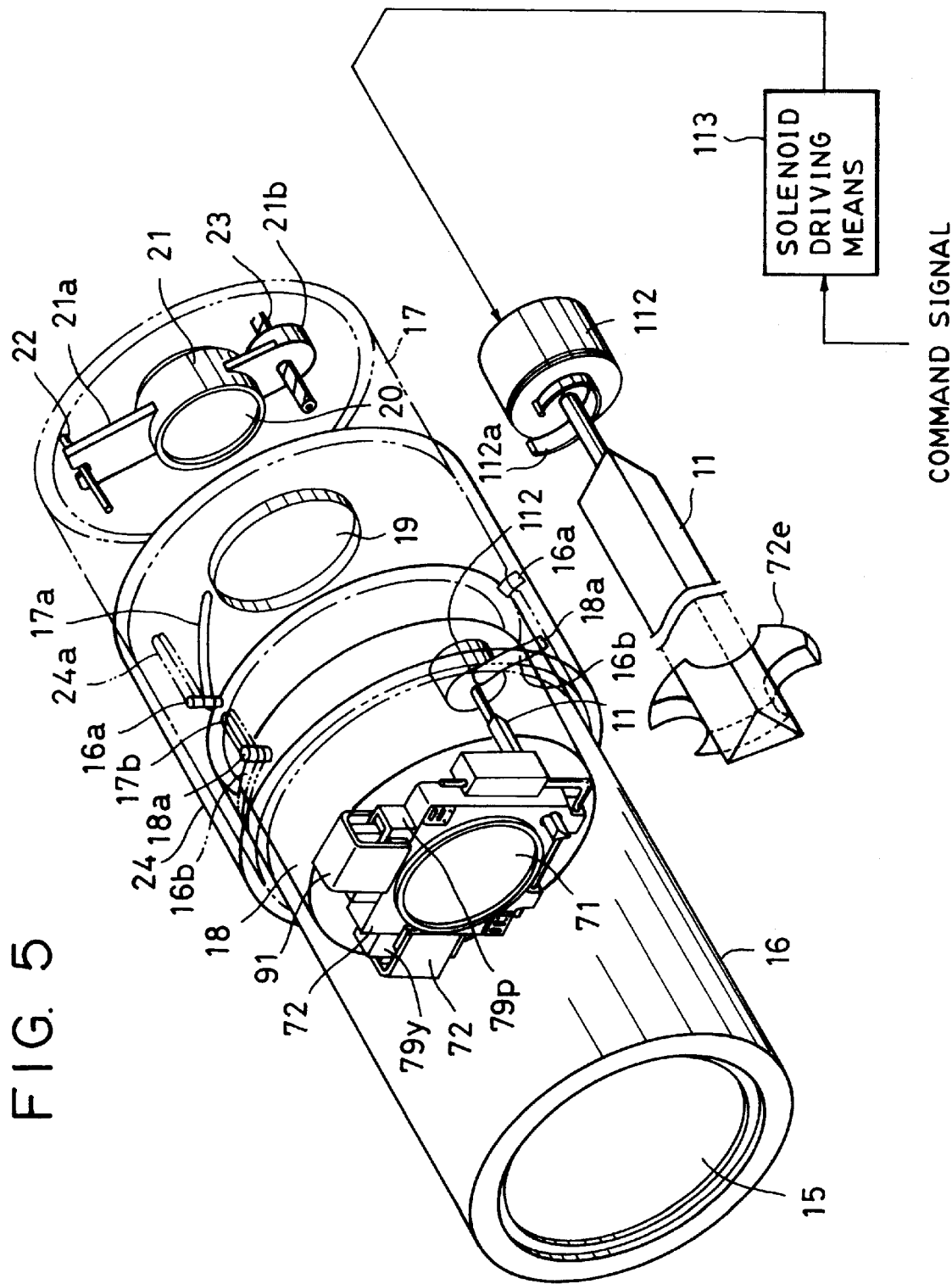
FIG. 5 is an exploded perspective view of the essential portion of an optical apparatus and a partially enlarged perspective view of the optical apparatus in accordance with a second embodiment of the present invention.

FIG. 5 shows an example in which a rotary solenoid is used as a rotation driving source for the shaft 11. A rotary solenoid 112 is rotated and urged in one direction (in a direction in which the lens holding frame 72 is locked) by a spiral spring 112a. A solenoid drive means 113 supplies electric current to the rotary solenoid 112 in response to the input of the command signal for activating the image blur correction means so that a rotational force which overcomes the spiral spring 112a is generated, causing the shaft 11 to rotate to release the locking of the lens holding frame 72 and also the movable range is widened. The solenoid drive means 113 stops the supply of electric current to the motor 12 in response to the input of a command signal for deactivating the image blur correction means. Thereupon, the shaft 11 returns to the original position (the minimum position at a movable width or the locked position) by the spring force of the spiral spring 112a. That is, only when the lens holding frame 72 is unlocked or it is desired to widen the movable width of the lens holding frame 72, electric current is supplied. With such a construction, a switch for detecting the amount of rotation of the shaft 11 is not necessary. As a command signal, the same command signal as that in the first embodiment is applicable.

In this embodiment also, in the same way as in the first embodiment (see FIG. 2), the three apices 11a of the shaft 11 and the semicircular projections 72f of the hole 72e are in a cam relation. When the lens holding frame 72 is shifted from the unlocked state to the locked state, the operation for acting the lens holding frame 72 in a direction toward the center is performed by the action of the cam. Since in this embodiment the shaft 11 is urged by the spiral spring 112a in the direction of the rotation in which the lens holding frame 72 is shifted from the unlocked state to the locked state, the above direction toward the center is performed by the urging force of the spring spiral 112a. Therefore, since the operation for acting in a direction toward the center can be performed without using electric power, even if the power is used up if the lens holding frame 72 is in the unlocked state, it is possible to move the lens holding frame 72 to the locking position at which it is locked. As a result, in such a case, the following can be prevented, namely, that the lens holding frame 72 is carried in a state in which the lens holding frame 72 is movable, and the lens holding frame 72 strikes the movable end, damaging the apparatus.

[Third Embodiment]

Figure 6:
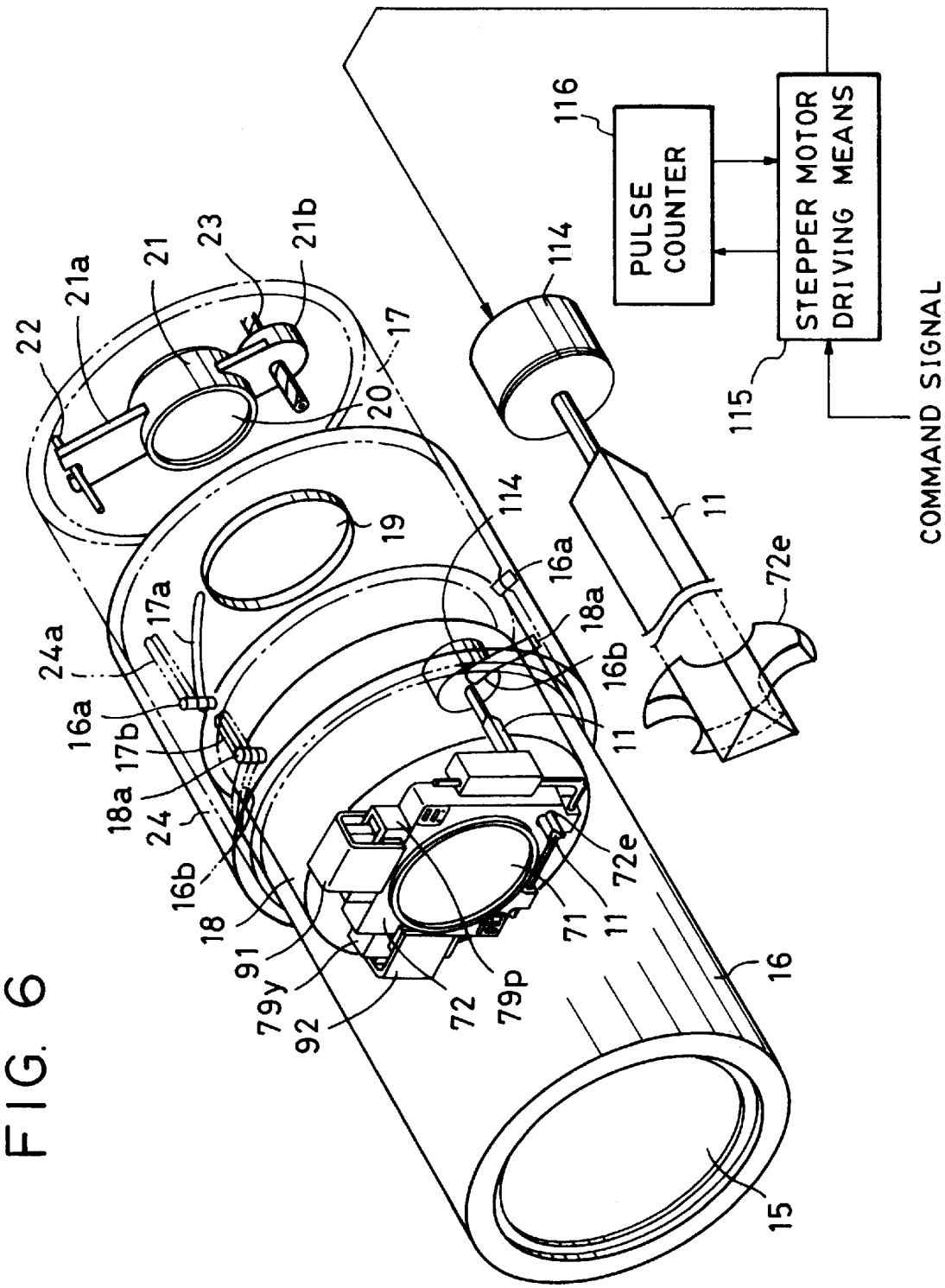
FIG. 6 is an exploded perspective view of the essential portion of an optical apparatus and a partially enlarged perspective view of the optical apparatus in accordance with a third embodiment of the present invention.

FIG. 6 shows an example in which a stepping motor is used as a driving source for the shaft 11. A stepping motor 114 is driven by a stepping motor drive means 115 in order to rotate the shaft 11. Since the amount of driving of the stepping motor can be monitored constantly by a pulse counter 116, it is always possible to know the amount of rotation of the shaft 11, and therefore it is possible to finely vary the movable range of the lens holding frame 72 when it is to be unlocked.

As described above, with a simple construction of the shaft and holes, it is possible to easily lock and unlock the lens holding frame 72 and to vary the movable range of the correction lens after the lens holding frame 72 is unlocked, and a large amount of space is not necessary in front of the lens holding frame 72. Thus, this is effective for making the optical apparatus compact. The operation for acting the lens holding frame 72 in a direction toward the center when it is shifted from the unlocked state to the locked state is the same as in the first embodiment.

Since, in the first embodiment shown in FIG. 1, a dedicated driving source for driving the shaft 11 is used, there is the merit that the locking and unlocking of the lens holding frame and the change in the movable range of the lens holding frame can be automatically performed independently of other functions of the camera. However, this is undesirable from the viewpoint of weight and cost. The command signal and the response of the stepping motor drive means 115 to the command signal are the same as in the first embodiment.

[Fourth Embodiment]

Figure 7:
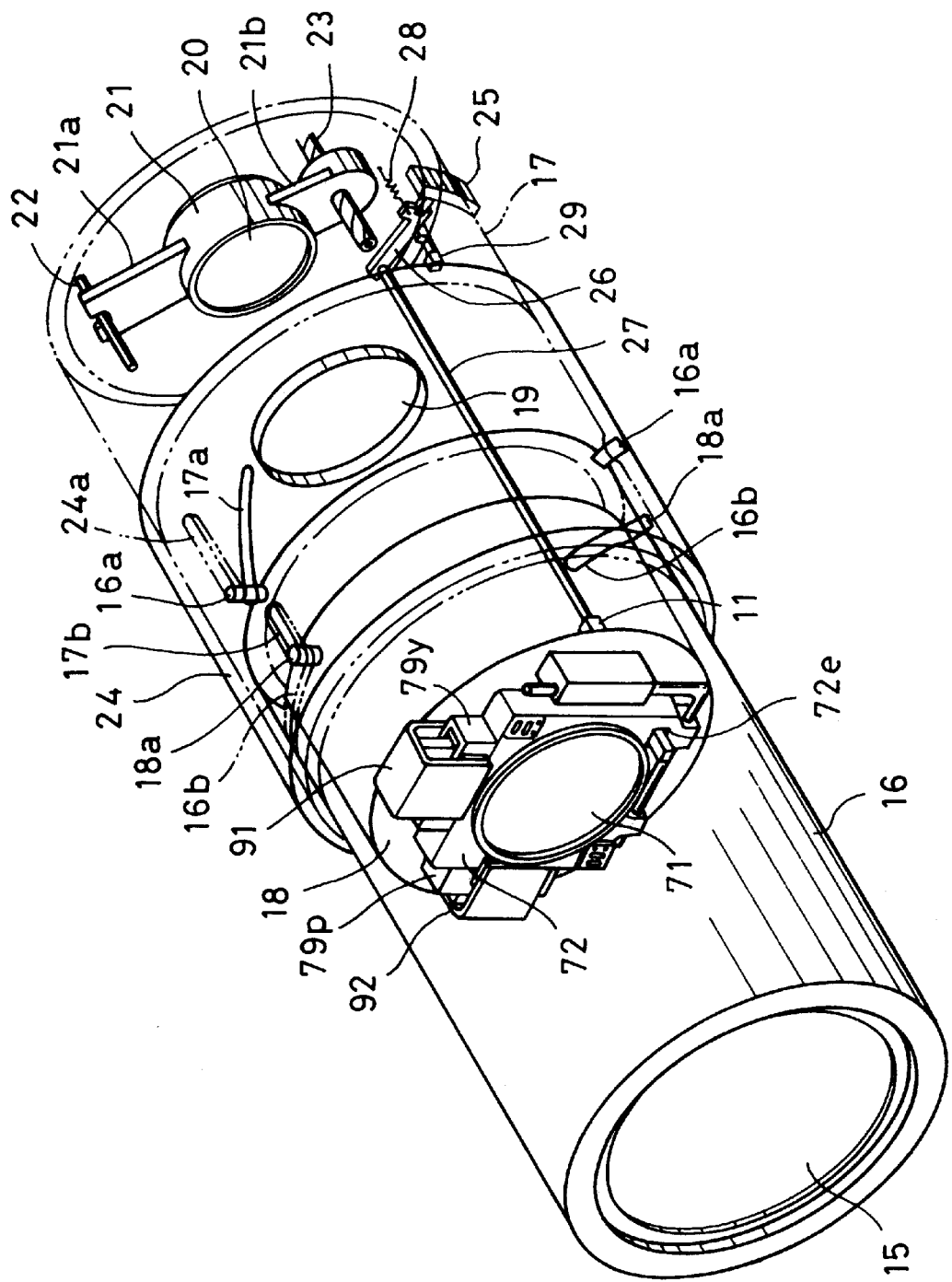
FIG. 7 is an exploded perspective view of the essential portion of an optical apparatus in accordance with a fourth embodiment of the present invention.

FIG. 7 shows a fourth embodiment of the present invention, in which the shaft 11 is manually driven. In FIG. 7, a slide knob 25 provided on the fixed barrel 17 is mounted so as to be slidable along the circumferential direction on the fixed barrel 17. A lever 26 is rotatable about a shaft 27, and the lever 26 is engaged with the slide knob 25 at one end and the rotation of the slide knob 25 about the fixed barrel 17 is converted into the rotation about the shaft 27.

The shaft 27 is rigidly secured concentrically to the shaft 11, and the rotation of the shaft 27 causes the play amount between the shaft 11 and the hole 72e to vary. A switch 29 is turned on at the position of the lever 26 when the play amount between the shaft 11 and the hole 72e is increased. This turning-on signal causes the shake prevention system to be activated. The lever 26 has been urged in a direction in which the play amount between the shaft 11 and the hole 72e is decreased by means of a spring 28 locked at one end to the fixed barrel 17. Only when the force of the spring 28 is overcome and the slide knob 25 is operated, the play amount is increased, unlocking the lens holding frame 72. It may be so constructed that when the slide knob 25 is operated for more than a predetermined amount, the knob is locked by a toggle spring or friction, and the play amount is increased. The lens holding frame 72 is then unlocked (the shake prevention system is activated) so that the slide knob need not constantly be operated. The operation for acting the lens holding frame 72 in a direction toward the center when the lens holding frame 72 is shifted from the unlocked state to the locked state is performed by the urging force of the spring in the same way as in the second embodiment.

Since the locking and unlocking of the lens holding frame is performed and the movable range of the lens holding frame when the lens holding frame is unlocked are changed by the operation by a photographer as described above, the optical apparatus can be made light-weight and less costly than a case in which a dedicated driving source shown in FIG. 1 is used.

[Fifth Embodiment]

FIG. 8 shows a fifth embodiment of the present invention, also illustrating an example in which the movable range of the lens holding frame 72 is varied by the zooming of the optical system. When the lens holding frame 72 is displaced to shift the optical axis in the zoom lens of this embodiment, there is a case in which the optical characteristics are not satisfied sufficiently when the optical axis is shifted to a maximum in the entire zoom area. When, for example, the lens holding frame 72 is shifted to a maximum when the optical system is on the wide side, the aberration of the optical system is increased and the image quality might deteriorate. In such a case, it is better to limit the worsening of the aberration than to correct the image blur (the influence of the image deterioration due to shake at zoom wide is small).

Therefore, when the wider the field view of the optical system, and the narrower the movable range of the lens holding frame 72 is made, a desirable photograph can be formed. In general, when an optical apparatus, such as a camera, is not used, the total length of the lens barrel is usually made short and housed, or carried. Thus, when the total length is short, the movable range of the lens holding frame 72 is minimized or the lens holding frame 72 is fixed by locking, the lens holding frame 72 is not shaken due to shake or the like during carrying, and there is no danger of being damaged. In the construction of FIG. 8, a shaft 72g in a square rigidly secured to the lens holding frame 72, having a square hole 31a of an annular restricting plate 31, is inserted into the hole 31a having gears on the outer circumferential edge, and the restricting plate 31 is rotatably supported about the shaft 72g on the second group lens holding barrel 18.

An inner gear 16d, which extends along the optical axis and is always engaged with the outer gear of the restricting plate even if the first group lens barrel 16 is moved along the optical axis, is provided inside the first group lens barrel 16. When the first group lens barrel 16 is moved along the optical axis by the zooming operation by the zoom operation ring 24 while the first group lens barrel 16 is rotating, the restricting plate 31 is rotated, and the play amount between the shaft 72g and the hole 31a varies, causing the movable range of the lens holding frame 72 to vary. When the rotation of the first group lens barrel 16 (the rotation by the zooming) and the phase of the hole 31a are so designed that the shorter the total length of the lens barrel, the smaller the play amount between the hole 31a and the shaft 72g, i.e., the narrower the movable range of the lens holding frame 72, the wider the field view of the optical system, the narrower the movable range of the lens holding frame 72 is made so as to prevent the aberration from increasing. The lens holding frame 72 can be locked by making the optical system placed at the wide end or further toward the wide side from the wide end, and thus safety during carrying can be obtained.

When the optical system is placed with the zoom wide, the movable range of the lens holding frame 72 is not changed, and the lens holding frame 72 may be locked only when the optical system is placed further toward the wide side from the wide end.

A restricting plate 32 of FIG. 9 may be used in place of the restricting plate 31 of FIG. 8. Four projections 32b are provided at 90° intervals in the inner circumferential edge of a circular hole 32a of the restricting plate 32. When the optical system is operated further toward the wide side from the zoom wide end, the projections 32b of the restricting plate 32 face the corner (edge) of the shaft 72g, and the movable range of the lens holding frame 72 becomes a minimum (or the lens holding frame 72 is locked). At other positions, it is possible to decrease the variation in the play amount between the shaft 11 and the hole 32a. With the above construction, the movable range of the lens holding frame 72 is not varied when each lens is zoomed; however, when the zoom operation ring 24 is rotated to the zoom wide side (ultra-wide side), it is possible to fix (lock) the lens holding frame 72.

Figure 10:
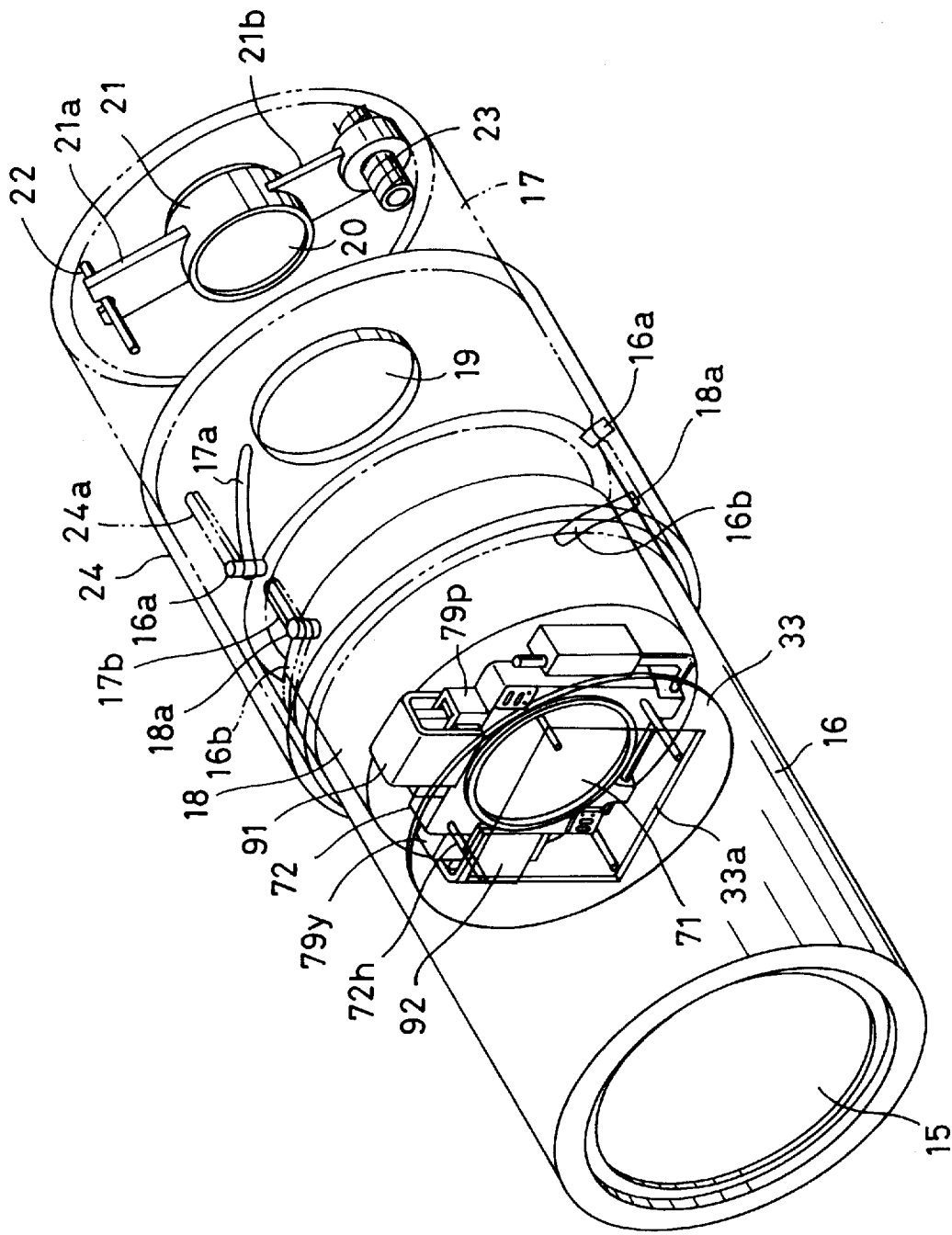
FIG. 10 is an exploded perspective view of the essential portion of an optical apparatus in accordance with a sixth embodiment of the present invention.

As a mechanism for varying the movable range of the lens holding frame 72, in addition to the mechanism shown in FIG. 8, the mechanism shown in FIG. 10 may be formed. In this embodiment also, when the lens holding frame 72 is shifted from the unlocked state to the locked state, the operation for acting the lens holding frame 72 in a direction toward the center is performed in the same way as in each of the embodiments described earlier.

[Sixth Embodiment]

In FIG. 10, four shafts 72h extend from the lens holding frame 72 to the front, and the shafts 72h are inserted into square holes 33a of a mask 33 mounted in the first group lens barrel 16. Since the mask 33 is rotated while it is being moved along the optical axis together with the first group lens barrel 16, the play between each shaft 72h and the holes 33a is varied by zooming, and the movable range of the lens holding frame 72 is varied in accordance with a zooming operation of the optical system.

Although in the above embodiment the movable range of the lens holding frame 72 is varied in linkage with the zooming of the photographic optical system, the focal length of the lens is often varied by not only zooming but also by focusing, the optical aberration may be increased when the lens holding frame 72 is displaced to a maximum in the vicinity of the focal point during close photographing. In this embodiment also, when the lens holding frame 72 is shifted from the unlocked state to the locked state, the operation for acting the lens holding frame 72 in a direction toward the center is performed in the same way as in each of the embodiments described earlier.

[Seventh Embodiment]

Figure 11:
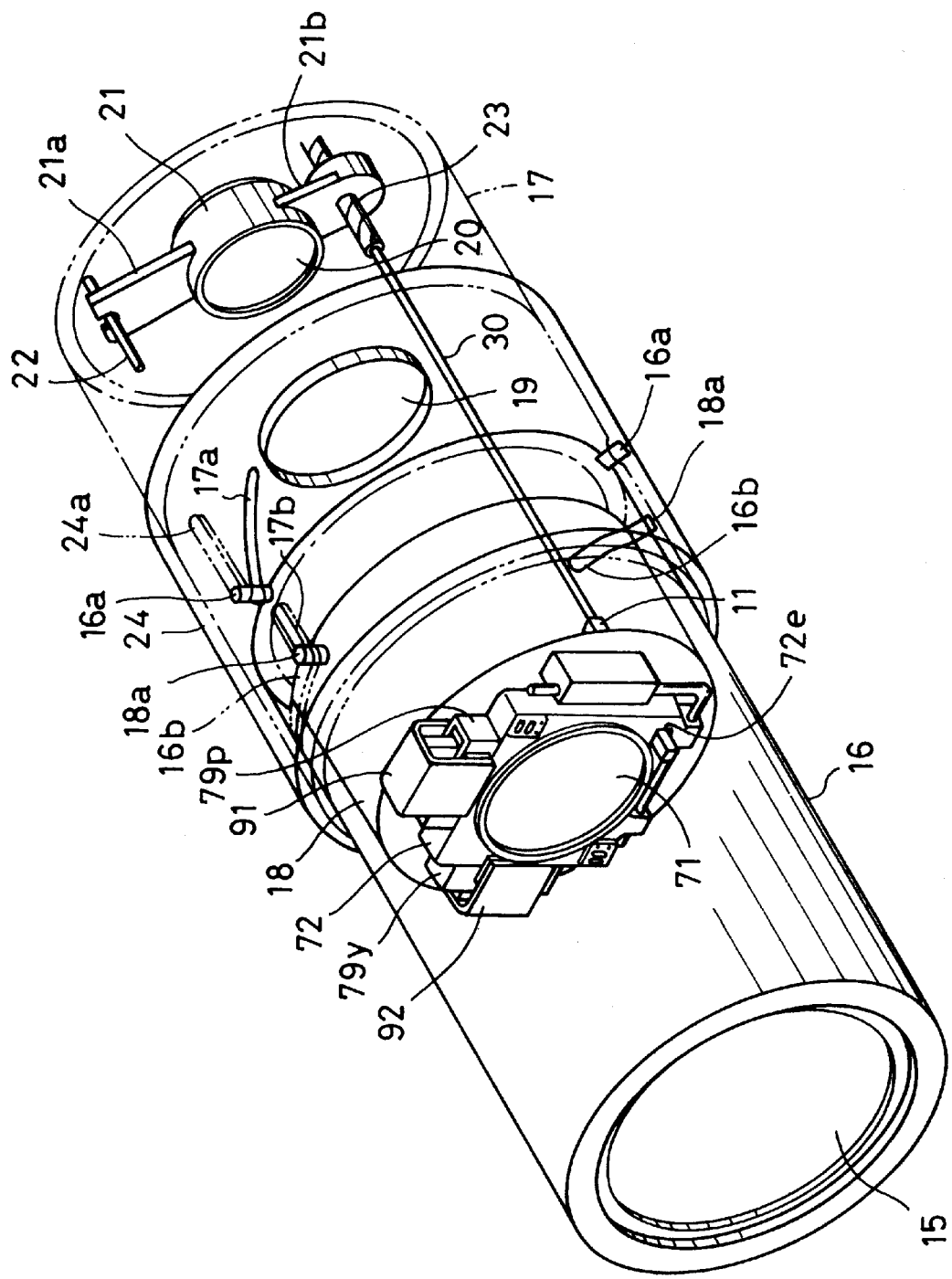
FIG. 11 is an exploded perspective view of the essential portion of an optical apparatus in accordance with a seventh embodiment of the present invention.

FIG. 11 shows an example in which the movable range of the lens holding frame 72 is varied in linkage with a focusing operation. The rectangular shaft 11 is rotated via a shaft 30 which is concentrically secured to the feed screw shaft 23 for driving the focusing lens, causing the play amount between the rectangular hole 72e provided in the lens holding frame 72 to vary. In this construction, the deterioration of image quality due to aberration can be prevented by setting the relative rotational relationship between the shaft 11 and the hole 72e in such a way that the closer to the closest focusing position the focusing lens 20, the smaller the play amount becomes. By stopping the focusing lens 20 at a closest position after a photograph is taken or the main switch of the camera has been turned off, the lens holding frame 72 is fixed without becoming loose during carrying, and thus safety is increased.

Although zooming and focusing are described separately in the above, needless to say, the varying of the movable range of the lens holding frame and the locking and unlocking thereof may be performed in linkage with both zooming and focusing. In this embodiment also, when the lens holding frame 72 is shifted from the unlocked state to the locked state, the operation for acting the lens holding frame 72 in a direction toward the center is performed in the same way as in each of the embodiments described earlier.

[Eighth Embodiment]

An embodiment in which shake prevention is performed only during exposure will now be described. In the example described below, the varying of the movable range of the lens holding frame and the locking and unlocking thereof are performed in linkage with a shutter or an aperture.

Figure 12:
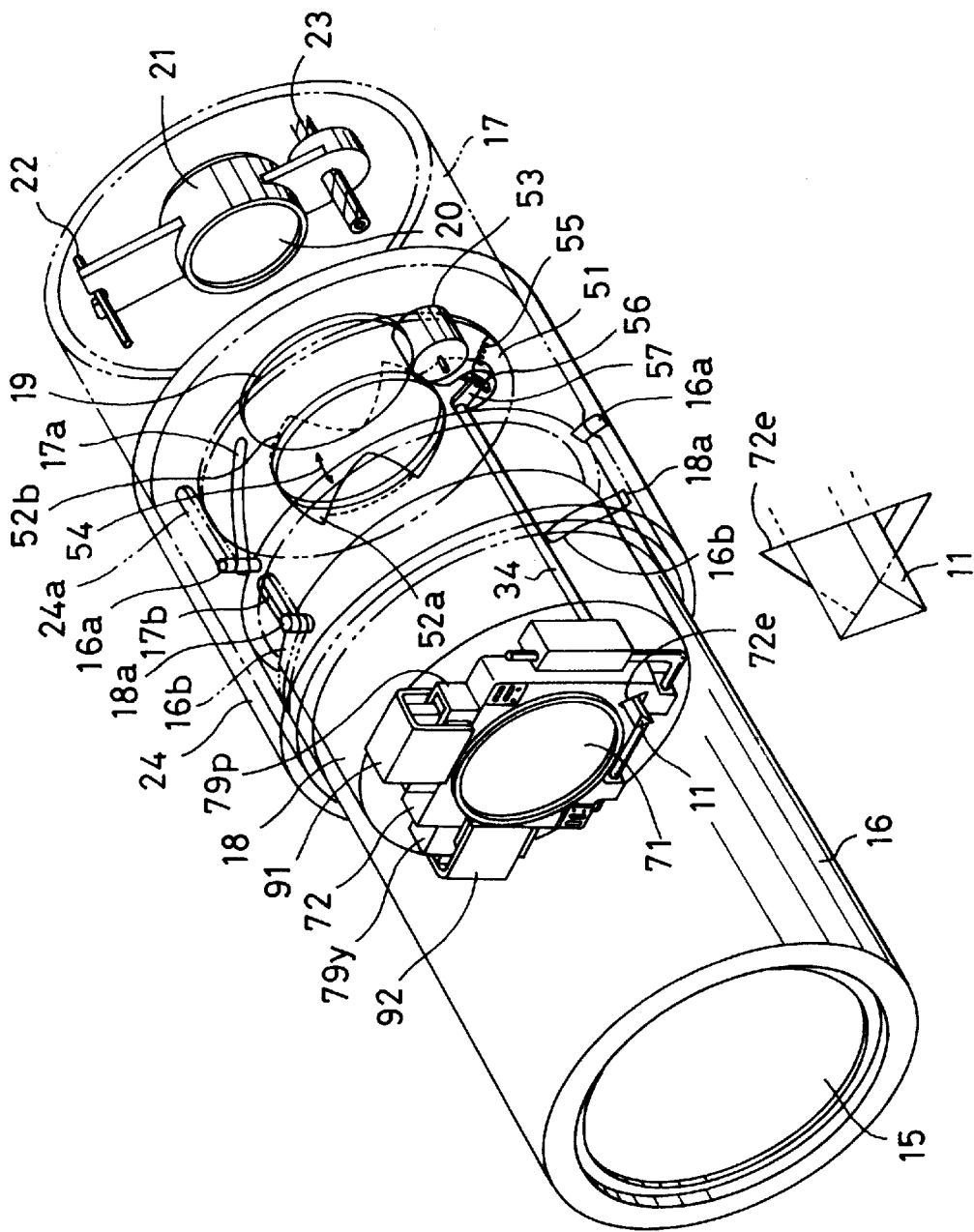
FIG. 12 is an exploded perspective view of the essential portion of an optical apparatus and a partially enlarged perspective view of the optical apparatus in accordance with an eighth embodiment of the present invention.

FIG. 12 shows an example in which the movable range of the lens holding frame is varied in linkage with the shutter operation. The optical apparatus of this embodiment has a shutter device inside the lens barrel. Known shutter blades 52a and 52b are mounted in a shutter plate 51 mounted on the fixed barrel 17, the shutter blades 52a and 52b are associatively operated by a known linkage mechanism, and the shutter blades 52a and 52b are turned oppositely to each other in the direction of an arrow 54. A motor 53 is a driving source for the shutter blades 52a and 52b. When electric current is supplied to the motor 53, the shutter is opened; when supply of electric current is stopped, the shutter is closed by the urging force of a spring 55 hooked between the shutter blade 52a and the shutter plate 51. A cam 56 on the shutter blade 52a drives a lever 57 in linkage with the shutter closing operation, causing a shaft 34 to rotate. As a result, the shaft 11 is rotated, and the movable range of the lens holding frame 72 is made narrower (the state indicated by the solid line in FIGS. 2 and 12). That is, shake prevention is performed with the movable range of the lens holding frame 72 being made wider from when the shutter begins to open until when it is fully opened. When the shutter is closed, the movable range of the lens holding frame 72 is made narrow or the lens holding frame 72 is locked, thus preventing the lens holding frame 72 from being shaken due to disturbance vibration or the like. Since the direction of the press-contact force between the hole 72e and the shaft 11 is at right angles to the direction of the shaking of the lens holding frame 72 due to disturbance in the above-described manner, there is no danger of the shaft 11 being turned during carrying. Also, since the lever 57 is connected to the shutter blade 52a by means of the cam 56, the shutter will not be moved as a result of the shaft 11 being turned. That is, although the shaft 11 is turned by driving the shutter, the shutter will not be opened due to vibration when the optical apparatus is carried.

In this embodiment also, when the lens holding frame 72 is shifted from the unlocked state to the locked state, the operation for acting the lens holding frame 72 in a direction toward the center is performed in the same way as in each of the above-described embodiments.

[Ninth Embodiment]

Figure 13:
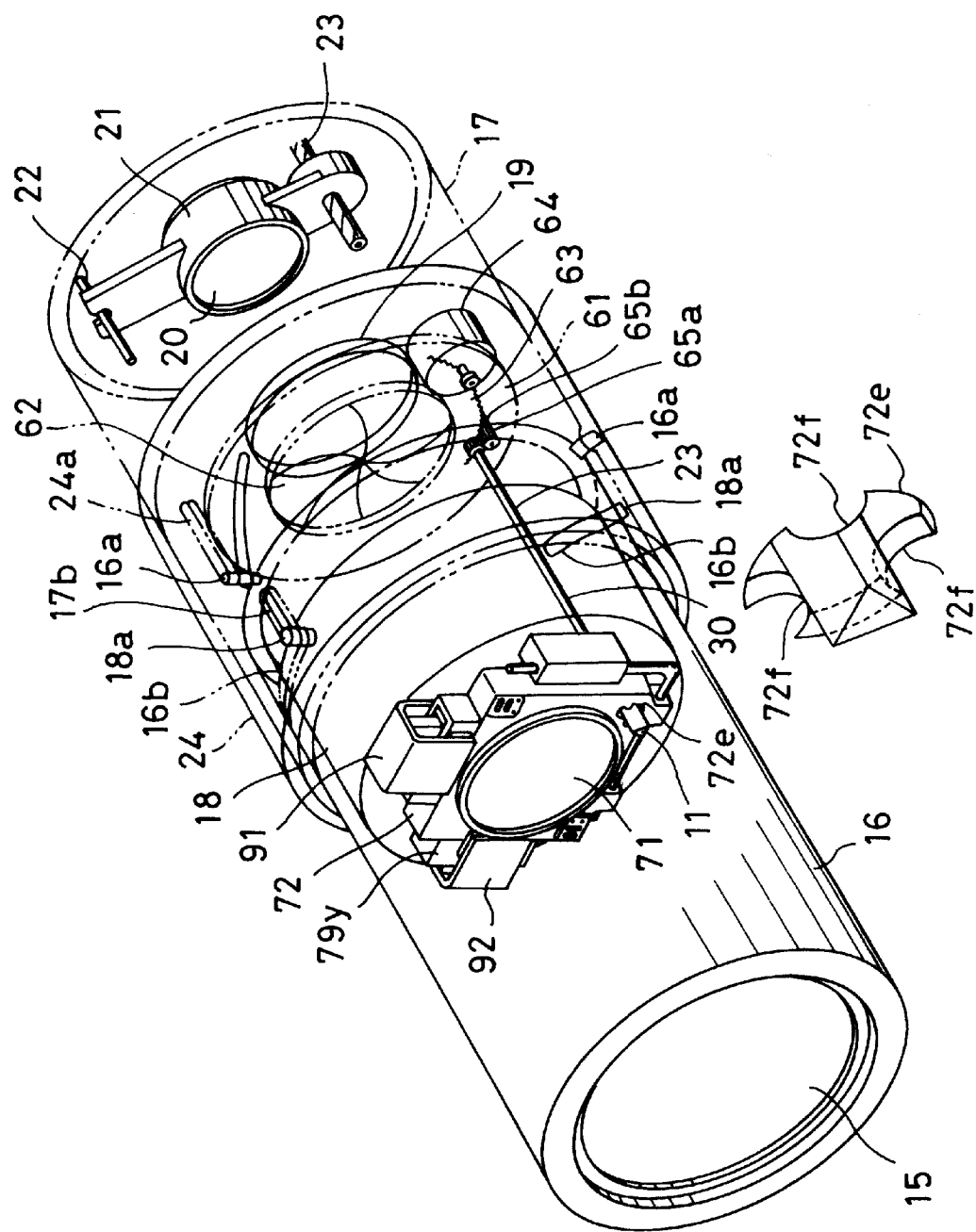
FIG. 13 is an exploded perspective view of the essential portion of an optical apparatus and a partially enlarged perspective view of the optical apparatus in accordance with a ninth embodiment of the present invention.

FIG. 13 shows a ninth embodiment of the present invention in which the aperture driving is linked with the operation for varying the movable range of the lens holding frame 72 and the operation for locking and unlocking the lens holding frame 72. In this embodiment, a plurality of aperture blades 62 which are turned in an aperture plate 61 mounted on the fixed barrel 17 are driven via a drive ring 63 by means of the driving force of a motor 64. The driving force of the drive ring 63 is transmitted to a shaft 30 via gears 65a and 65b, and the shaft 11 is rotated, causing the movable range of the lens holding frame 72 to vary and the lens holding frame 72 is locked or unlocked. The shaft 11 and the hole 72e in this embodiment are the same as those shown in FIG. 2.

Only when the aperture is driven further toward the open side by full aperture, the lens holding frame 72 is locked with the projection 72f of the hole 72e facing the corner of the shaft 11. That is, usually, the lens holding frame 72 is locked in over a full aperture state; however, when the motor is driven in a direction in which the aperture is reduced, the lens holding frame 72 is unlocked and also the movable range of the lens holding frame 72 is widened. In this embodiment also, when the lens holding frame 72 is shifted from the unlocked state to the locked state, the operation for acting the lens holding frame 72 in a direction toward the center is performed in the same way as in each of the above-described embodiments.

As described above, since in the construction shown in FIGS. 7, 8, and 10 to 13 the varying of the movable range of the lens holding frame and the locking and unlocking of the lens holding frame are performed by a manual operation, a zoom driving source, a focus driving source, an aperture driving source, a shutter driving source and the like, the optical apparatus can be made light-weight and less costly than a case in which a dedicated driving source is used.

Although the above-described embodiment describes an image blur prevention apparatus in which a correction lens is applied to a shake prevention apparatus by which image blur is corrected by moving the correction lens in a direction at right angles to the optical axis, this invention need not be limited to this example. It is a matter of course that the present invention can be applied to a construction for performing the locking and unlocking of the correction optical means and varying the movable range of the correction optical means in, for example, a shake prevention apparatus which tilts a lens in the optical path, for instance, a variable apical-angle prism, or a shake prevention apparatus which corrects blur of an image formed in an image pickup element by displacing the image pickup element.

Although the above-described embodiment describes only a case in which the restricting means is formed of a combination of a shaft having a non-circular cross-sectional shape and non-circular holes, it is clear that a combination of a cam and a follower in place of the combination of a shaft and holes may be used.

Although in the above-described embodiment a correction lens is locked after the correction lens is moved to a locking position when the correction lens is shifted from the unlocked state to the locked state, a locking member may be moved to a locking position without moving the correction lens when the correction lens is to be locked.

The correction lens may also be locked by a method other than a method in which the correction lens is locked as a result of a member being brought into abutment with the correction lens. For example, a magnetic field may be formed beforehand so that the correction lens is maintained at a predetermined position by the action of a permanent magnet during locking, and when the correction lens is unlocked, electric current is made to flow through a coil or the like, causing an electromagnetic force to be generated to vary the magnetic field generated by the permanent magnet, and thus the correction lens is made movable.

Although each of the above-described embodiments describes an example in which an image blur prevention mechanism is disposed within an interchangeable lens for a camera, the present invention is not limited to this example, and it may be applied to an arrangement in which an image blur prevention mechanism is disposed in a camera or other optical apparatus.

The present invention can be applied to not only an imaging apparatus, but also various observation apparatuses or recording apparatuses, and need not be limited to the lens barrel described in the embodiments.

In each embodiment, technical elements may be combined as required.

The individual components shown in schematic or block form in the Drawings are well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

It is claimed:

1. An image blur prevention apparatus comprising:

a movable member for preventing image blur; and a restricting device which performs a restricting operation for restricting movement of said movable member, said restricting device includes a projecting portion projecting through said movable member and moving in a predetermined direction to move said movable member from a position at which said restricting device does not perform the restricting operation to a position at which said restricting device performs the restricting operation and an elastic force generating portion which generates a positive elastic force for moving said projecting portion in the predetermined direction.

2. An image blur prevention apparatus according to claim 1, wherein said restricting device comprises means for moving said moving portion, by the elastic force, to move said movable member to a position at which said restricting device is able to perform the restricting operation.

3. An image blur prevention apparatus according to claim 1, further comprising: means for restricting the action of the elastic force at least when an image blur is prevented.

4. An image blur prevention apparatus according to claim 1, wherein said restricting device comprises means for mechanically restricting movement of said movable member.

5. An image blur prevention apparatus according to claim 1, wherein said movable member comprises an optical member.

6. An image blur prevention apparatus according to claim 1, wherein said apparatus comprises means for being provided for an optical apparatus.

7. An image blur prevention apparatus according to claim 1, wherein said apparatus comprises means for being provided for a camera.

8. An apparatus according to claim 1, wherein said restricting device comprises a first member and a second member which slides with respect to said first member, and said movable member is moved by sliding of said second member.

9. An apparatus according to claim 8, wherein at least one of said first and second members is arranged with said movable member in a body.

10. An apparatus according to claim 8, wherein at least one of said first and second members rotates causing said second member to slide relative to said first member.

11. A camera comprising:

a movable member for preventing image blur; and a restricting device which performs a restricting operation for restricting movement of said movable member, said restricting device includes a projecting portion projecting through said movable member and moving in a predetermined direction to move said movable member from a position at which said restricting device does not perform the restricting operation to a position at which said restricting device performs the restricting operation and an elastic force generating portion which generates a positive elastic force for moving said projecting portion in the predetermined direction.

12. An optical apparatus comprising:

a movable member for preventing image blur; and a restricting device which performs a restricting operation for restricting movement of said movable member, said restricting device includes a projecting portion projecting through said movable member and moving in a predetermined direction to move said movable member from a position at which said restricting device does not perform the restricting operation to a position at which said restricting device performs the restricting operation and an elastic force generating portion which generates a positive elastic force for moving said projecting portion in the predetermined direction.

13. An image blur prevention apparatus, comprising:

a movable member for preventing image blur;

a driving device which drives said movable member for preventing image blur; and a restricting device which performs a restricting operation for restricting movement of said movable member, said restricting device comprising a first member which rotates around a predetermined rotation center and a second member which contacts said first member, wherein, by rotating said first member, said restricting device shifts a position at which said first member contacts said second member from a first position to a second position, a distance of the second position from the rotation center being different from a distance of the first position from the rotation center, and moves said movable member to a position at which said restriction device performs the restricting operation.

14. An apparatus according to claim 13, wherein the distance of the second position from the rotation center is shorter than the distance of the first position from the rotation center, and said restricting device further comprises means for moving said second member toward the rotation center by rotating said first member.

15. An apparatus according to claim 13, wherein said restricting device further comprises means for restricting said movable member at a position at which said first member contacts said second member at the second position.

16. An apparatus according to claim 13, wherein said second member and said movable member move together.

17. An apparatus according to claim 16, wherein said second member and said movable member are arranged in a body.

18. An apparatus according to claim 13, wherein said first member comprises an area on which said second member slides, the area including the first and second positions.

19. An apparatus according to claim 13, wherein said movable member comprises an optical member.

20. An apparatus according to claim 19, wherein said first member comprises a member surrounding an optical path through which light passes said optical member, said member being able to rotate around the optical path.

21. An apparatus according to claim 13, wherein said driving device comprises means for moving said movable member in accordance with a state of the image blur.

22. An apparatus according to claim 13, wherein said driving device comprises means for driving said movable member by an electrical force.

23. An apparatus according to claim 22, wherein said driving device comprises a coil and a permanent magnet.

24. A camera comprising:

a movable member for preventing image blur;

a driving device which drives said movable member for preventing image blur; and a restricting device which performs a restricting operation for restricting movement of said movable member, said restricting device comprising a first member which rotates around a predetermined rotation center and a second member which contacts said first member, wherein, by rotating said first member, said restricting device shifts a position at which said first member contacts said second member from a first position to a second position, a distance of the second position from the rotation center being different from a distance of the first position from the rotation center, and moves said movable member to a position at which said restriction device performs the restricting operation.

25. An optical apparatus comprising:

a movable member for preventing image blur;

a driving device which drives said movable member for preventing image blur; and a restricting device which performs a restricting operation for restricting movement of said movable member, said restricting device comprising a first member which rotates around a predetermined rotation center and a second member which contacts said first member, wherein, by rotating said first member, said restricting device shifts a position at which said first member contacts said second member from a first position to a second position, a distance of the second position from the rotation center being different from a distance of the first position from the rotation center, and moves said movable member to a position at which said restriction device performs the restricting operation.

26. An image blur prevention apparatus, comprising:

a movable member for preventing image blur; and restricting means for performing a restricting operation for restricting movement of said movable member, said restricting means including a projecting portion projecting perpendicularly relative to said movable member and a receiving portion at least partially surrounding said projecting portion, at least one of said projecting portion and said receiving portion moving relative to the other of said projecting portion and said receiving portion in a predetermined direction thereby moving said restricting device from a position at which said restricting device does not perform the restricting operation to a position at which said restricting device performs the restricting operation, said restricting device further including an elastic force generating portion which generates a positive elastic force for moving said at least one of said projecting portion and said receiving portion in the predetermined direction.

27. An image blur prevention apparatus as recited in claim 26, wherein said movable member includes a frame and said projecting portion rotates relative to said frame.

28. An image blur prevention apparatus as recited in claim 26, wherein said movable member includes a frame and said receiving portion rotates relative to said frame.

29. An image blur prevention apparatus, comprising:

a movable member for preventing image blur; and a restricting device for restricting movement of said movable member, wherein said restricting device includes (1) a moving portion which moves in a predetermined direction to move said movable member from a position at which said restricting device does not restrict the movable member to a position at which said restricting device restricts the movable member and (2) an elastic force generating portion which generates a positive elastic force for moving said moving portion in the predetermined direction, wherein said moving portion is separated from said movable member by a first predetermined distance when said restricting device does not restrict said movable member, and said moving portion is separated from said movable member by a second predetermined distance shorter than the first predetermined distance when said restricting device restricts said movable member.

* * * * *

UNITED STATES PATENT AND TRADEMARK OFFICE
CERTIFICATE OF CORRECTION

PATENT NO. : 5,974,268
DATED : October 26, 1999
INVENTOR(S) : Koichi Washisu

It is certified that error appears in the above-identified patent and that said Letters Patent is hereby corrected as shown below:

Delete Figures 4(a), 4(b) and Figure 5 and substitute therefore the Figures 4(a) thru 4(d) and Fig. 5, as shown on the attached pages.

Sheet 3,
FIGS. 4 (a) and 4 (b) should be replaced by attached FIGS. 4 (a) - 4 (d).

Sheet 4,
FIG. 5 should be replaced by attached FIG. 5.

Column 7,
Line 49, "FIGS. 4 (a) and 4 (b)" should read -- FIGS. 4 (a), 4 (b), 4 (c) and 4 (d) --.

Column 12,
Line 46, "FIG. 4 (b)" should read -- (FIG. 4 (b)), --.

Column 29, claim 13,
Lines 7-9, "wherein the half-life of the hybrid peptide, which has been injected into a rabbit, is 34 hours ± 4 hours" should read -- which has a half life of 34 hours ± 4 hours in a rabbit --.

Column 30, claim 14,
Lines 2-3, "wherein the half-life of the hybrid peptide, which has been injected into a rabbit, is 34 hours ± 4 hours" should read -- which has a half-life of 34 hours ± 4 hours --.

UNITED STATES PATENT AND TRADEMARK OFFICE
CERTIFICATE OF CORRECTION

PATENT NO.    : 5,974,268
DATED         : October 26, 1999
INVENTOR(S)   : Koichi Washisu It is certified that error appears in the above-identified patent and that said Letters Patent is hereby corrected as shown below:

Title page,
Item [73], "Assignee: Rhone-Poulenc" should read -- Assignee: Rhone-Poulenc Sante --.

Signed and Sealed this

Eighteenth Day of December, 2001

Attest:

Attesting Officer

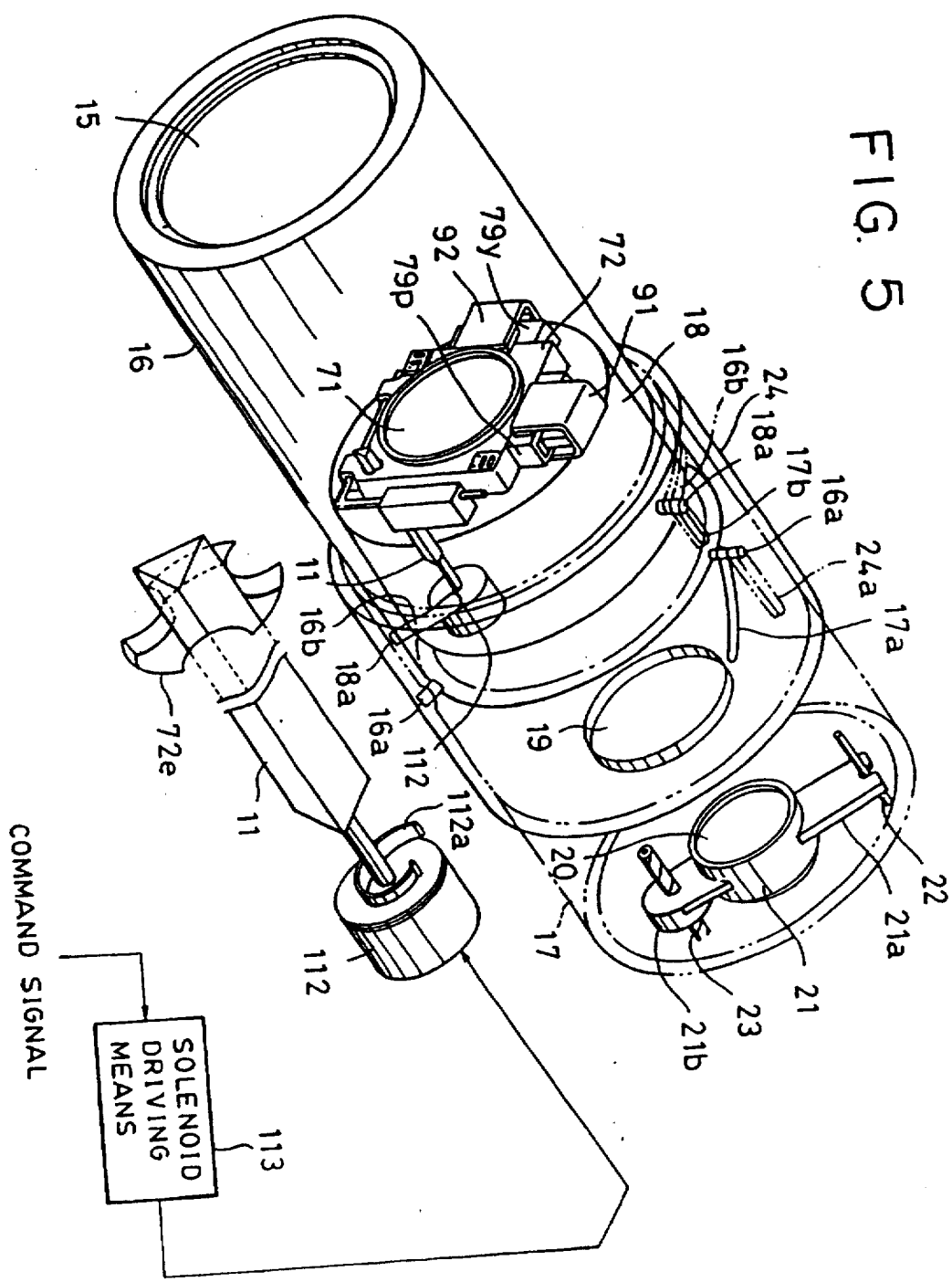

JAMES E. ROGAN
Director of the United States Patent and Trademark Office